(12) United States Patent
Entezarian et al.

(10) Patent No.: US 7,166,140 B2
(45) Date of Patent: Jan. 23, 2007

(54) HIGH CAPTURE EFFICIENCY BAFFLE

(75) Inventors: Majid Entezarian, Hudson, WI (US); James R. Johnson, Lady Lake, FL (US); Timothy L. Hoopman, River Falls, WI (US); Charles S. Brunner, North Reading, MA (US); Christopher T. Zirps, Sharon, MA (US)

(73) Assignee: Philips Plastics Corporation, Phillips, WI (US)

( * ) Notice: Subject to any disclaimer, the term of this patent is extended or adjusted under 35 U.S.C. 154(b) by 75 days.

(21) Appl. No.: 10/699,573

(22) Filed: Oct. 31, 2003

(65) Prior Publication Data

US 2005/0087069 A1   Apr. 28, 2005

Related U.S. Application Data

(63) Continuation-in-part of application No. 10/690,454, filed on Oct. 22, 2003.

(51) Int. Cl.
*B01D 50/00* (2006.01)
*B01D 45/06* (2006.01)
*B01D 45/08* (2006.01)

(52) U.S. Cl. .................. 55/320; 55/440; 55/442; 55/464; 55/DIG. 36

(58) Field of Classification Search ............... 95/272; 55/320, 440, 442, 444, DIG. 36, 464
See application file for complete search history.

(56) References Cited

U.S. PATENT DOCUMENTS

| | | | |
|---|---|---|---|
| 768,415 A * | 8/1904 | Wingrove | ........... 55/444 |
| 1,743,675 A | 1/1930 | Anders | |
| 1,872,892 A | 8/1932 | Clanton | |
| 1,896,656 A * | 2/1933 | Anderson | ........... 29/460 |
| 1,926,924 A * | 9/1933 | Sylvan | ........... 55/440 |
| 2,621,755 A | 12/1952 | Gray, Jr. | |
| 2,633,929 A | 4/1953 | Farr | |
| 2,641,331 A | 6/1953 | Hudson | |
| 2,794,514 A | 6/1957 | Risley | |
| 2,886,124 A | 5/1959 | Scharmer | |
| 2,978,064 A | 4/1961 | Deaver | |
| 3,049,399 A | 8/1962 | Gamson et al. | |
| 3,077,714 A * | 2/1963 | McLivaine | ........... 96/311 |
| 3,354,623 A | 11/1967 | Keller | |
| 3,433,146 A * | 3/1969 | Russell | ........... 126/299 E |

(Continued)

FOREIGN PATENT DOCUMENTS

DE    74699    5/1893

(Continued)

OTHER PUBLICATIONS

International Search Report for Application No. PCT/US2004/023377, 6 pages.

(Continued)

*Primary Examiner*—Robert A. Hopkins
(74) *Attorney, Agent, or Firm*—Foley & Lardner LLP

(57) ABSTRACT

A baffle is disclosed which comprises a plurality of substantially S-shaped baffle members and a frame configured to hold the baffle members substantially parallel to each other. The baffle is configured to separate one or more entrained substances from an air stream.

39 Claims, 17 Drawing Sheets

U.S. PATENT DOCUMENTS

| | | |
|---|---|---|
| 3,674,683 A | 7/1972 | Rainer |
| 3,785,124 A | 1/1974 | Gaylo |
| 3,837,269 A | 9/1974 | Sweet et al. |
| 3,854,912 A | 12/1974 | Terrel et al. |
| 3,955,949 A | 5/1976 | Rohrer |
| 3,970,558 A | 7/1976 | Lee |
| 4,022,118 A | 5/1977 | Vandas |
| 4,042,352 A | 8/1977 | Shujiro et al. |
| 4,082,661 A | 4/1978 | Aoki et al. |
| 4,104,163 A | 8/1978 | Grutsch |
| 4,105,422 A | 8/1978 | Kiguchi |
| 4,118,206 A | 10/1978 | Hagendoorn |
| 4,126,433 A | 11/1978 | Forssberg et al. |
| 4,154,812 A | 5/1979 | Sanchez et al. |
| 4,172,031 A | 10/1979 | Hall et al. |
| 4,177,142 A | 12/1979 | Halbfoster |
| 4,231,768 A | 11/1980 | Seibert et al. |
| 4,235,200 A | 11/1980 | Shay |
| 4,238,334 A | 12/1980 | Halbfoster |
| 4,239,513 A * | 12/1980 | Paul et al. ............ 96/48 |
| 4,292,285 A | 9/1981 | Nakao et al. |
| 4,319,898 A | 3/1982 | Maierhofer |
| 4,328,105 A | 5/1982 | Arbuckle |
| 4,350,504 A | 9/1982 | Diachuk |
| 4,388,086 A | 6/1983 | Bauer et al. |
| 4,484,563 A | 11/1984 | Fritz et al. |
| 4,485,622 A | 12/1984 | Takagi et al. |
| 4,534,775 A | 8/1985 | Frazier |
| 4,545,792 A * | 10/1985 | Huttlin ............ 96/320 |
| 4,595,509 A | 6/1986 | Fox et al. |
| 4,604,110 A | 8/1986 | Frazier |
| 4,610,705 A | 9/1986 | Sarnosky et al. |
| 4,629,479 A | 12/1986 | Cantoni |
| 4,645,605 A | 2/1987 | Durham |
| 4,682,992 A | 7/1987 | Fuchs |
| 4,708,000 A | 11/1987 | Besik |
| 4,721,624 A | 1/1988 | Schumann |
| 4,805,525 A | 2/1989 | Bivens |
| 4,811,724 A | 3/1989 | Aalto et al. |
| 4,816,499 A | 3/1989 | Nomura et al. |
| 4,830,644 A | 5/1989 | Gutermuth |
| 4,854,949 A | 8/1989 | Giles, Sr. et al. |
| 4,872,892 A | 10/1989 | Vartiainen et al. |
| 4,900,341 A | 2/1990 | Csabai |
| 4,902,316 A | 2/1990 | Giles et al. |
| 4,908,050 A | 3/1990 | Nagashima et al. |
| 4,921,509 A | 5/1990 | Maclin |
| 4,923,725 A | 5/1990 | Zafiroglu |
| 4,944,782 A | 7/1990 | Rajendran et al. |
| 4,969,936 A | 11/1990 | Schweigert et al. |
| 4,973,341 A | 11/1990 | Richerson |
| 4,976,760 A | 12/1990 | Helferich et al. |
| 5,002,040 A | 3/1991 | MacFarlane |
| 5,003,693 A | 4/1991 | Atkinson et al. |
| 5,022,901 A | 6/1991 | Meunier |
| 5,053,064 A | 10/1991 | Hama et al. |
| 5,087,272 A | 2/1992 | Nixdorf |
| 5,124,177 A | 6/1992 | Kasmark, Jr. et al. |
| 5,133,786 A | 7/1992 | Anderson |
| 5,145,648 A | 9/1992 | Miyahara et al. |
| 5,154,743 A | 10/1992 | Takato et al. |
| 5,171,720 A | 12/1992 | Kawakami |
| 5,179,061 A | 1/1993 | Haerle |
| 5,209,887 A | 5/1993 | Von Blücher et al. |
| 5,211,159 A | 5/1993 | Lieblein et al. |
| 5,251,608 A | 10/1993 | Cote |
| 5,288,298 A | 2/1994 | Aston |
| 5,302,354 A | 4/1994 | Watvedt et al. |
| RE34,636 E | 6/1994 | Bivens |
| 5,320,088 A | 6/1994 | Nester |
| 5,342,422 A | 8/1994 | Wimbock |
| 5,384,290 A | 1/1995 | Brezny |
| 5,404,799 A | 4/1995 | Bivens |
| 5,442,924 A | 8/1995 | Tsai et al. |
| 5,472,342 A | 12/1995 | Welsh, II et al. |
| 5,479,907 A * | 1/1996 | Walker, Jr. ............ 123/573 |
| 5,486,370 A | 1/1996 | Bivens |
| 5,497,620 A | 3/1996 | Stobbe |
| 5,512,088 A | 4/1996 | McKenzie |
| D373,625 S | 9/1996 | Pereira |
| 5,567,090 A | 10/1996 | Basak et al. |
| 5,567,392 A | 10/1996 | Becker et al. |
| 5,624,875 A | 4/1997 | Nakanishi et al. |
| 5,628,916 A | 5/1997 | Stevens et al. |
| 5,632,889 A | 5/1997 | Tharp |
| 5,637,124 A | 6/1997 | Diachuk |
| 5,651,803 A | 7/1997 | Diachuk |
| 5,669,947 A | 9/1997 | Diachuk |
| 5,671,726 A | 9/1997 | Hsu |
| 5,679,120 A * | 10/1997 | Yamada et al. ............ 55/440 |
| 5,693,298 A | 12/1997 | Bar-Ilan |
| 5,700,973 A | 12/1997 | Siddiqui |
| 5,733,350 A | 3/1998 | Muller et al. |
| 5,750,026 A | 5/1998 | Gadkaree et al. |
| 5,766,458 A | 6/1998 | Sekhar et al. |
| 5,776,354 A | 7/1998 | Van der Meer et al. |
| 5,792,360 A | 8/1998 | Algar |
| 5,810,895 A | 9/1998 | Stachle et al. |
| 5,874,052 A | 2/1999 | Holland |
| 5,884,474 A | 3/1999 | Topsøe |
| 5,902,182 A | 5/1999 | Kramer |
| 5,964,927 A | 10/1999 | Graham et al. |
| 5,976,221 A | 11/1999 | Bowman et al. |
| 5,997,618 A | 12/1999 | Schneider et al. |
| 6,010,558 A | 1/2000 | Ackland |
| 6,041,772 A | 3/2000 | Ward et al. |
| 6,042,628 A | 3/2000 | Nishikiori et al. |
| 6,050,208 A | 4/2000 | Kennedy |
| 6,051,199 A | 4/2000 | Teller |
| 6,074,177 A | 6/2000 | Kobayashi et al. |
| 6,077,335 A | 6/2000 | Schneider et al. |
| 6,077,800 A | 6/2000 | Takahashi et al. |
| 6,079,407 A | 6/2000 | Lai |
| 6,083,408 A | 7/2000 | Breitenbach et al. |
| 6,095,037 A | 8/2000 | Savage et al. |
| 6,099,808 A | 8/2000 | Miller et al. |
| 6,165,519 A | 12/2000 | Lehrer et al. |
| 6,168,651 B1 | 1/2001 | Tuma et al. |
| 6,235,249 B1 | 5/2001 | Fu et al. |
| 6,237,587 B1 | 5/2001 | Sparling et al. |
| 6,251,153 B1 | 6/2001 | Neitzel et al. |
| 6,290,742 B1 | 9/2001 | Pakkala et al. |
| 6,293,983 B1 | 9/2001 | More |
| 6,340,379 B1 | 1/2002 | Penth et al. |
| 6,341,498 B1 | 1/2002 | DiFoggio |
| 6,344,074 B1 | 2/2002 | Ward et al. |
| 6,432,177 B1 | 8/2002 | Dallas et al. |
| 6,454,825 B1 | 9/2002 | Cheimets et al. |
| 6,464,770 B1 | 10/2002 | Palm et al. |
| 6,468,323 B1 | 10/2002 | Chwala |
| 6,471,876 B1 | 10/2002 | Hansen et al. |
| 6,605,648 B1 | 8/2003 | Johnson et al. |
| 6,627,088 B1 | 9/2003 | Breitenbach et al. |
| 6,630,016 B2 | 10/2003 | Koslow |
| 6,641,788 B1 | 11/2003 | Ogawa et al. |
| 6,797,041 B2 | 9/2004 | Brownell et al. |
| 6,814,783 B2 | 11/2004 | Fitch et al. |
| 6,833,022 B2 | 12/2004 | Feisthemmel et al. |
| 6,843,817 B2 | 1/2005 | Noda et al. |
| 6,878,175 B2 | 4/2005 | Keller et al. |
| 2003/0024393 A1 | 2/2003 | Lim |
| 2003/0101986 A1 | 6/2003 | Maier |
| 2003/0164093 A1 | 9/2003 | Brownell et al. |
| 2004/0011203 A1 | 1/2004 | Fitch et al. |

| | | | |
|---|---|---|---|
| 2004/0139858 A1 | 7/2004 | Entezarian et al. | |
| 2005/0022482 A1 | 2/2005 | Bockle et al. | |

FOREIGN PATENT DOCUMENTS

| | | |
|---|---|---|
| DE | 836 344 | 4/1952 |
| DE | 1 979 281 | 11/1967 |
| DE | 2 035 789 | 2/1971 |
| DE | 2 163 183 | 7/1973 |
| DE | 2 206 904 | 9/1973 |
| DE | 74 17 517 | 2/1975 |
| DE | 24 44 741 A1 | 4/1975 |
| DE | 81 02 859 U1 | 7/1981 |
| DE | 33 09 208 A1 | 9/1984 |
| DE | 87 01 860 U1 | 5/1987 |
| DE | 37 12 279 A1 | 10/1988 |
| DE | 40 16 582 A1 | 11/1991 |
| DE | 40 39 855 A1 | 6/1992 |
| DE | 91 05 430 U1 | 10/1992 |
| DE | 41 38 845 A1 | 5/1993 |
| DE | 93 11 478 U1 | 11/1993 |
| DE | 44 27 074 A1 | 2/1996 |
| DE | 295 11 237 U1 | 6/1996 |
| DE | 196 13 463 A1 | 10/1997 |
| DE | 197 05 808 C1 | 6/1998 |
| DE | 299 06 345 U1 | 8/1999 |
| DE | 198 10 818 A1 | 9/1999 |
| DE | 299 06 295 U1 | 9/1999 |
| DE | 200 05 154 U1 | 7/2000 |
| DE | 199 06 318 A1 | 8/2000 |
| DE | 101 26 842 A1 | 12/2002 |
| DE | 101 27 678 A1 | 1/2003 |
| DE | 102 08 474 A1 | 9/2003 |
| EP | 0 007 385 B1 | 2/1980 |
| EP | 0 046 137 B1 | 2/1982 |
| EP | 0 121 809 A1 | 10/1984 |
| EP | 0 263 892 A1 | 4/1988 |
| EP | 0 298 000 A2 | 1/1989 |
| EP | 0 301 640 A1 | 2/1989 |
| EP | 0 398 847 A2 | 11/1990 |
| EP | 0 443 301 A1 | 8/1991 |
| EP | 0 443 673 B1 | 8/1991 |
| EP | 0 612 962 B1 | 8/1994 |
| EP | 0 722 071 B1 | 7/1996 |
| EP | 0 722 072 B1 | 7/1996 |
| EP | 0 726 428 B1 | 8/1996 |
| EP | 0 857 508 B1 | 8/1998 |
| EP | 0 974 790 B1 | 1/2000 |
| EP | 1 055 883 A2 | 11/2000 |
| EP | 1 134 501 A1 | 9/2001 |
| EP | 1 238 679 A1 | 9/2002 |
| FR | 2 066 045 | 8/1971 |
| FR | 2 244 558 | 4/1975 |
| FR | 2 338 092 | 8/1977 |
| FR | 2 385 998 | 10/1978 |
| FR | 2 423 255 | 11/1979 |
| FR | 2 768 942 | 4/1999 |
| GB | 1014594 | 12/1965 |
| GB | 1 255 268 | 12/1971 |
| GB | 1 434 847 | 5/1976 |
| GB | 4 436 710 | 5/1976 |
| GB | 2 002 106 | 2/1979 |
| GB | 1 551 487 | 8/1979 |
| GB | 2 029 567 | 3/1980 |
| GB | 1 569 146 | 6/1980 |
| GB | 2 141 816 | 3/1985 |
| GB | 2 340 053 | 2/2000 |
| GB | 2 346 643 | 8/2000 |
| WO | WO 97/45189 A1 | 12/1997 |
| WO | WO 02/070105 A3 | 9/2000 |
| WO | WO 02/070105 A2 | 9/2002 |

OTHER PUBLICATIONS

Aerosol Science, Davies, C.N., 1966, 6 pages, Academic Press, London and New York.
Aerosols; Science, Technology, and Industrial Applications of Airborne Particles, Liu, Benjamin Y.H., Pui, David Y.H., and Fissan, Heinz J., Sep. 17-21, 1984, 6 pages, Minneapolis, MN.
CRC Handbook of Environmental Control, vol. I: Air Pollution; Richard G. Bond and Conrad P. Straub, 1972, 3 pages, CRC Press, Cleveland, OH.
Desiccant Silica Gel, Silicagel.net, available by at least Oct. 7, 2003, 2 pages.
Engineering and Design Adsorption Design Guide, Department of the Army, U.S. Army Corps of Engineers, Mar. 1, 2001, 99 pages, Design Guide No. 1110-1-2.
Fuchs, N.A., The Mechanics of Aerosols, Karpov Institute of Physical Chemistry, Moscow, 1964, 4 pages, The MacMillan Company, NY.
Greenheck, Grease Grabber Filter Style Kitchen Hood, Feb. 2005, 1 page, Greenheck Fan Corp.
Heating, Ventilating and Air-Conditioning, Systems and Equipment, 1996 ASHRAE Handbook, 5 pages, American Society of Heating, Refrigerating and Air-Conditioning Engineers, Inc., Atlanta, GA.
Heating, Ventilating, and Air-Conditioning, Applications, 1999 ASHRAE Handbook, 6 pages, American Society of Heating, Refrigerating and Air-Conditioning Engineers, Inc., Atlanta, GA.
Hinds, William C., Aerosol Technology; Properties, Behavior; and Measurement of Airborne Particles, 1999, 5 pages, John Wiley & Sons.
International Search Report and Written Opinion for PCT-US2004-032311, Mar. 1, 2005, 9 pages.
Jin, Do Won, et al., FTIR Study of Adsorption on Silica Gel for Organic Solvents Diluted in Supercritical Carbon Dioxide, Journal of Chemical Engineering of Japan, abstract, 1996, 1 page.
Latest Development, Meigao Chemical Co., Ltd., copright date of 2002-2005, 3 pages.
Scott, RPW, Liquid Chromatography, obtained from http://www.chromatography-online.org/HPLC/Stationary-Phases/Silica-Gel/rs41.html, marked with 2002-2003 copyright date, 11 pages.
Sell, Nancy J., Industrial Pollution Control, Issues and Techniques; 1981, 7 pages, Van Nostrand Reinhold Company.
Silica Gel, Grace Davison, available at least as of Mar. 8, 2005, 2 pages.
Standard Handbook for Mechanical Engineers, Baumeister, Theodore, Editor, Seventh Edition, 1967, 3 pages, McGraw-Hill, Inc.
Greenheck Fan Corporation, "Overview," 6 pgs., marked as Oct. 27, 2000.
Clark, J., Commercial Kitchen Ventilation/IMC-2000, (date unknown), 7 pgs.
Clark, J., Commercial Kitchen Ventilation Design: What You need to Know, Jan. 29, 2003, 5 pgs.
Elliott, G., et al., The Increasing Use of Ceramic Filters in Air Pollution Control Applications, Filtr. Sep. vol. 34, No. 4, pp. 331-335, 1997, Elsevier Science Ltd.
Filter som sätter miljön i första rummet, airMet Metal Filter, Luftfilter, obtained from website @ www.luftfilter.com, Feb. 2001, 8 pgs.
Filter which puts the environment first, airMet Metal Filter, Luftfilter, obtained from website @ www.luftfilter.com, Oct. 2001, 8 pgs.
6Grease-X-Tractor TM Centrifugal Filtration, Grease Grabber TM-80 Two-Stage Filtration System, Greenheck, Aug. 2003, 17 pgs.
Greenheck Promotional Materials for "Grease Grabber-80," 2002, 18 pgs.
Greenheck Takes the Grease Out of Kitchen Ventilation, Dec. 2001, 4 pgs.

Greenheck, Various Promotional Materials, (date unknown), 10 pgs.

International Search Report for Application No. PCT/US2004/023377, Oct. 19, 2004, 6 pgs.

List Prices Effective Jan. 1, 2000, How to Order Flame Gard Grease Filters, Flame Gard, obtained from website @ www.flamegard.com, 4 pgs.

Livchak et al., The Facts Mechanical Grease, American Society of Heating, Refrigerating and Air-Conditioning Engineers, Inc., Copyright 2003, Kitchen Ventilation / A Supplement to ASHRAE Journal Jun. 2003, (P. K14-K17, 4 pgs.).

Sherer, M., Clearing the Air, Foodservice Equipment Report, Jun. 2003; pp. 228-231.

Singh, N. et al., Process Design and Economic Analysis of A Ceramic Membrane System for Microfiltration of Com Starch Hydrolysate; Journal of Food Engineering, vol. 38, No. 1, 1998, Elsevier Science Ltd.; pp. 57-67.

Takmodul med flytande tätning, Luftfilter, obtained from website www.luftfilter.com, Jun., 2001, 4 pgs.

United Air Specialists, Inc., Promotional Materials for "Smog-Hog," 2001, 4 pgs.

VandenBoom, M., Greenheck Product Presentation, Oct. 23, 2002, 26 pgs.

We prioritise expertise, Luftfilter, obtained from website @ www.luftfilter.com, Feb., 1999, 4 pgs.

* cited by examiner

HIGH CAPTURE EFFICIENCY BAFFLE

CROSS-REFERENCE TO OTHER PATENT APPLICATIONS

This application is a continuation in part of U.S. patent application Ser. No. 10/690,454, entitled "Filtration Media of Porous Inorganic Particles," filed on Oct. 22, 2003, pending, which is hereby expressly incorporated by reference in its entirety. U.S. patent application Ser. No. 10/632,805, entitled "Separation Apparatus" filed on Aug. 4, 2003, pending, is also hereby expressly incorporated by reference in its entirety.

BACKGROUND

The present disclosure relates generally to the field of baffles, and, more particularly, to the field of baffles for a kitchen hood.

Cooking foods containing oily substances causes the emission of aerosols and vapors that include substances such as grease, soot, etc. that may coat kitchen hoods and ductwork which are meant to channel the emissions away from the kitchen environment. Grease that is not deposited on the ductwork is carried to the exterior of the building where it creates further problems. For example, grease buildup on the exterior of the building may cause the building to decay at a faster rate (e.g., grease buildup on a rubber membrane roof) and adversely affect the appearance of the building. Grease deposited at the outlet of the exhaust/duct system may also act as a source of fuel for a fire or as a slippery coating on walkways. To minimize these problems, kitchen hoods have been designed to carry, capture, and contain grease.

Conventional kitchen hoods use a baffle or mesh filter in the hood or ductwork to capture the effluent grease particles. A baffle generally operates by deflecting the exhaust stream as it passes through the baffle so that heavier substances (e.g. liquids such as grease, solids, etc.) imp act the surface of the baffle. After impacting the surface of the baffle, these substances drain to a collection area. A mesh filter typically uses fibers or metal scrim to capture the grease.

Unfortunately, these conventional filters suffer from a number of deficiencies. These filters generally capture only larger substances and have limited efficiency. Because more of the substances make it through these filters and are deposited inside the ductwork or outside the building, these areas must be cleaned more often, which often entails considerable additional expense. Also, in some instances, conventional filters such as mesh filters need frequent cleaning and/or replacement. Accordingly, it would be desirable to provide an improved baffle.

Of course, the claims define the scope of the subject matter for which protection is sought, regardless of whether any of the aforementioned disadvantages are overcome by the subject matter recited in the claims. Also, the terms recited in the claims should be given their ordinary and customary meaning as would be recognized by those of skill in the art, except, to the extent a term is used herein in a manner more expansive than its ordinary and customary meaning, the term should be given its ordinary and customary meaning plus the additional expansive meaning, or except if a term has been explicitly defined to have a different meaning by reciting the term followed by the phase "as used herein shall mean" or similar language. Accordingly, the claims are not tied to any particular embodiment, feature, or combination of features other than those explicitly recited in the claims.

SUMMARY

According to one embodiment, a baffle comprises a plurality of substantially S-shaped baffle members and a frame configured to hold the baffle members substantially parallel to each other. The baffle is configured to separate one or more entrained substances from an air stream.

According to another embodiment a baffle comprises a frame and a plurality of substantially S-shaped baffle members. The frame is configured to hold: the baffle members in an overlapping, substantially parallel relationship to each other.

According to another embodiment, a kitchen hood comprises a frame and a plurality of baffle members. The frame comprises a first side and a second side. Each of the plurality of baffle members comprises a first surface that extends from the first side of the frame to the second side of the frame. The first surface is bent at a first angle and at a second angle. The first angle is greater than 180 degrees and the second angle is less than 180 degrees. The angles are measured from the first surface.

According to another embodiment, a baffle to remove a substance from an air stream comprises a frame and a plurality of baffle members. The frame includes a first side and a second side. The are substantially parallel to each other and extend between the first, side of the frame and the second side of the frame. The baffle members define a plurality of channels each comprising a single entry opening and a single exit opening.

According to another embodiment, a baffle comprises a plurality of baffle members and a frame. Each of the plurality of baffle members includes rounded edges configured to deflect an air stream as it passes through the baffle. The frame is configured to hold the baffle members in a substantially parallel relationship to each other.

According to another embodiment, a kitchen hood comprises a baffle. The baffle includes a plurality of baffle members each of which comprises rounded edges.

According to another embodiment a baffle comprises a plurality of baffle members and a frame configured to hold the baffle members in an overlapping, substantially parallel relationship to each other. At least some of the baffle members are shaped similar to two conjoined U shapes.

According to another embodiment a baffle comprises a plurality of baffle members defining a plurality of channels and a frame. Each channel is configured to deflect an air stream as the air stream passes through the channel. The frame is configured to hold the baffle members in a substantially parallel relationship to each other. Separation media is positioned inside the channels.

According to another embodiment, a kitchen hood comprises a baffle which includes a plurality of substantially S-shaped baffle members. The baffle members are configured to separate one or more entrained substances from an air stream.

According to another embodiment, a baffle comprises a plurality of baffle members and a frame. Each of the plurality of baffle members comprises a base, a first side wall, and a second side wall where the side walls extend outwardly from the same side of the base. The frame is configured to hold the baffle members in a substantially parallel relationship to each other. The baffle members also are arranged in at least two offset and opposed rows where the first and second side walls of one baffle member extend toward the first and second side walls of the opposed baffle members. The base of at least some of the baffle members comprises a recess where the base extends toward a space which is between two adjacent opposed baffle members.

According to another embodiment, a baffle comprises a plurality of baffle members and a frame. Each of the plurality of baffle members comprises a base, a first side wall, and a second side wall, where the side walls extend outwardly from the same side of the base. The frame is configured to hold the baffle members in a substantially parallel relationship to each other. The baffle members also are arranged in at least two opposed rows where the first side wall of one baffle member extends toward and overlaps the first side wall of another baffle member in an interlocking relationship and the second side wall of the one baffle member extends toward and overlaps the second side wall of yet another baffle member in an interlocking relationship.

According to another embodiment, a method of making a baffle comprises providing a plurality of substantially S-shaped baffle members and coupling the plurality of S-shaped baffle members to a frame. The frame comprises a first side and a second side and the baffle members extend from the first side to the second side and are positioned substantially parallel to each other.

According to another embodiment, a method for separating an entrained substance from an air stream comprises passing an air stream through a plurality of substantially So, shaped baffle members where the S-shaped baffle members are held substantially parallel to each other by a frame.

According to another embodiment, a baffle comprises means for separating an entrained substance from an air stream and a frame configured to hold the means.

DETAILED DESCRIPTION

With reference to the accompanying Figures, the present disclosure relates to baffles and systems (e.g., grease capture systems, residential kitchen hoods, commercial kitchen hoods, etc.) that use baffles to separate an entrained substance (e.g., grease, soot, other particles, etc.) from a fluid stream (e.g., gas stream, kitchen exhaust stream, etc.). Also, the present disclosure relates to methods of making such baffles. While the subject matter herein is presented in the context of the use of baffles in the field of kitchen hoods, the baffles may also be utilized in alternative applications, as will be appreciated by those of ordinary skill (e.g., laboratory hoods, air filtration systems, paintspray booths etc.). In addition to removing substances commonly found in a kitchen exhaust stream, the baffle may also be capable of filtering and/or collecting other types of organic, inorganic, hydrophobic, hydrophilic, and/or amphiphilic particles, and may include living organisms such as bacteria and viruses. Multiple embodiments of baffles and systems are described herein that may be combined with one another in a variety of ways to provide additional embodiments unless noted otherwise.

Figure 1:
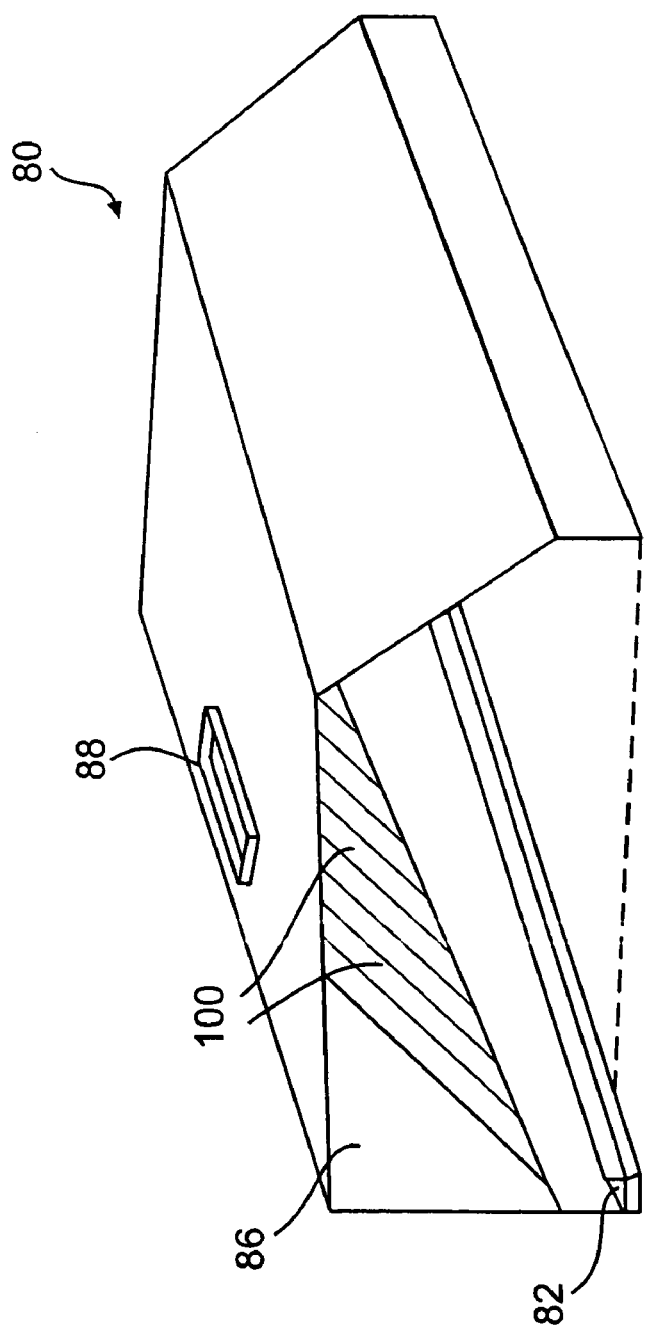
FIG. 1 is a cross-sectional side perspective view of a hood according to one embodiment.

Referring to FIG. 1, a cross-sectional side perspective view of an exemplary embodiment of a hood 80 is shown. Hood 80 includes a plurality of baffles 100, a grease trough 82, an exhaust chamber 86, and an exhaust chamber outlet 88. As shown, hood 80 is a tapered canopy hood. However, in other embodiments, hood 80 may be any of a number of different types of hoods such as a box canopy, a V-bank box canopy, or other hood suitable for use with the baffles disclosed herein.

In one embodiment, hood 80 is part of a system that is used to vent exhaust (e.g., air or gas stream including entrained substances) from the interior of a building (e.g., where a food item is being cooked) to the exterior of the building and into the atmosphere. In addition to hood 80, the system may include ductwork and a fan. The ductwork is desirably coupled to hood 80 and extends through the walls to the outside of the building where the exhaust is released through the exhaust port. The fan is used to move the exhaust from hood 80, through the ductwork, and outside of the building. In one embodiment, the fan is coupled to the ductwork at a position exterior to the structure (e.g., the fan may be positioned on the: roof of the building, etc).

Baffles 100 are generally used to separate substances such as grease, soot, etc. from the exhaust stream, thus preventing the grease from accumulating in exhaust chamber 86, on the ductwork, and/or near the exhaust port (e.g., the roof of the building). As the substance (e.g., grease) is separated from the exhaust stream it is collected in trough 82. Trough 82 may be configured so that the grease flows into a grease collector (not shown). For example, trough 82 may be configured to be sloped so that the grease flows to one or more collectors that allow the grease to be disposed of easily (e.g., the grease collector is a removable reservoir that is easily emptied).

In an exemplary embodiment, baffles 100 are positioned near the opening of exhaust chamber 86. Generally, this position is desirable because the grease is removed before entering exhaust chamber 86 and/or the ductwork. However, in other embodiments, baffles 100 may be positioned in the ductwork, adjacent exhaust chamber outlet 88, or adjacent the exhaust port. In short, baffles 100 may be positioned in any suitable location in a system to provide the desired separation capability.

Figure 2:
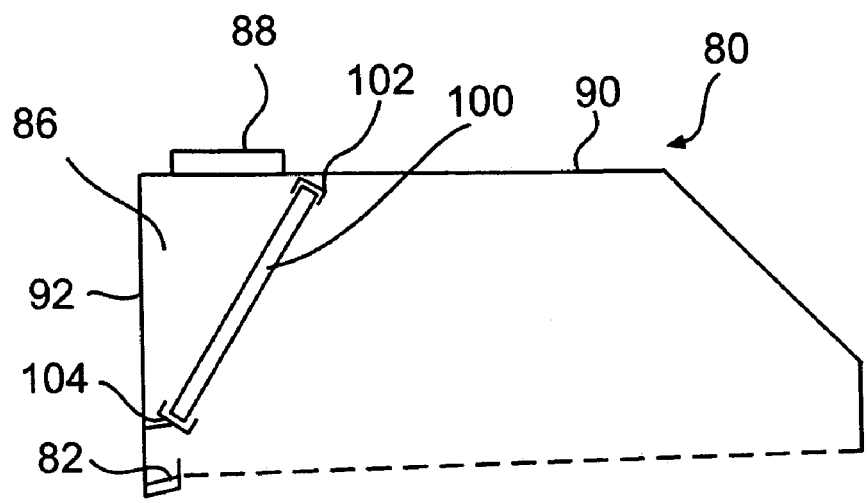
FIG. 2 is a cross-sectional side view of a hood according to another embodiment.

Referring to FIG. 2, a cross-sectional side view of hood 80 is shown. In one embodiment, one of baffles 100 is positioned in hood 80 using an upper railing 102 and a lower railing 104. Upper railing 102 extends downward and away from a top 90 of hood 80 and towards a side 92 of hood 80. Lower railing 104 extends upward and outward from side 92 towards top 90. Railings 102 and 104 can be substantially U-shaped, as shown, but can also have other suitable shapes. Baffles 100 are configured to be received by and extend between upper railing 102 and lower railing 104.

Figure 3:
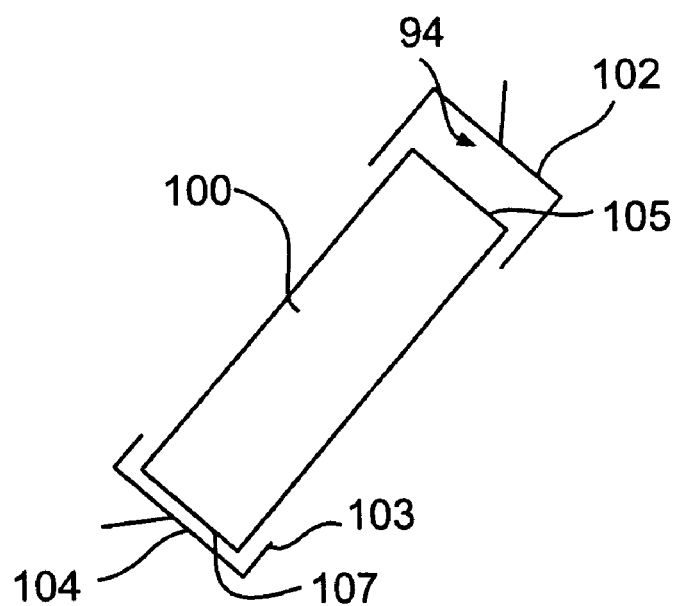
FIG. 3 is a cross-sectional side view of a baffle according to another embodiment.

FIG. 3 shows an exemplary embodiment of one of baffles 100 positioned between upper and lower railings 102 and 104 of hood 80. Baffle 100 is positioned as shown by inserting a top side 105 of baffle 100 into upper railing 102 until a bottom side 107 of baffle 100 is able to clear a lip 103 of lower railing 104. Bottom side 107 is then moved to a position in line with lower railing 104. Baffle 100 is then lowered so that bottom side 107 is positioned in lower railing 104. When bottom side 107 is in lower railing 104, top side 105 is held in place by upper railing 102. However, by lowering bottom side 107, a space 94 is created between top side 105 and upper railing 102. Accordingly, this configuration allows baffle 100 to be easily removed from hood 80 for periodic cleaning and, if necessary, to be replaced.

Other embodiments may be used to position baffle 100 in hood 80. In one embodiment, top side 105 may include a lip with a downward bent leading edge that meshes with a corresponding lip on hood 80 having an upward bent leading edge. In another embodiment, baffle 100 may be positioned in hood 80 using a flip-up clasp. Accordingly, any of a number of suitable devices, fasteners, and mechanisms may be used to position baffle 100 in hood 80.

Figure 5:
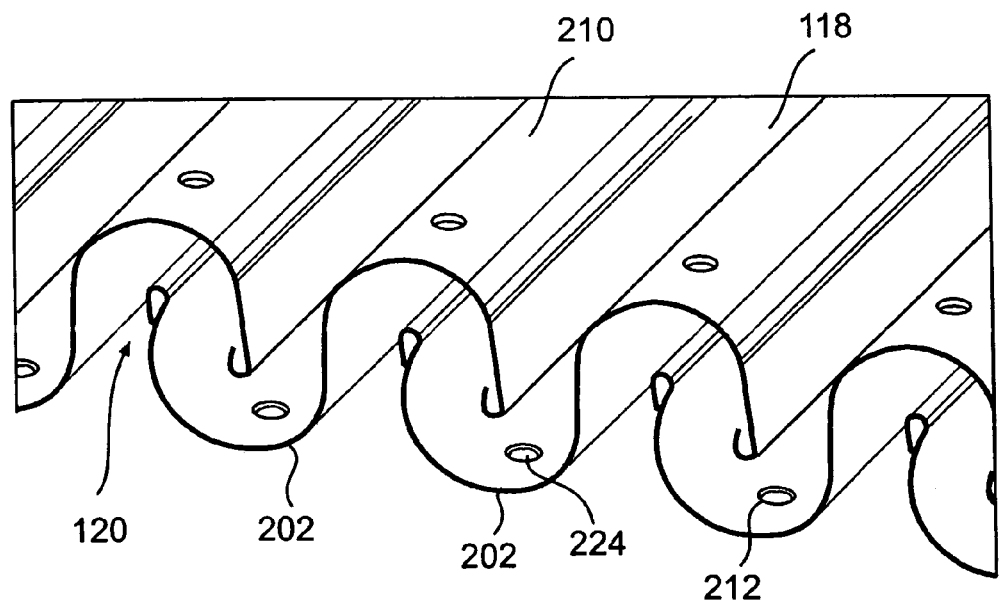
FIG. 5 is a perspective view of a plurality of baffle members according to one embodiment.
Figure 6:
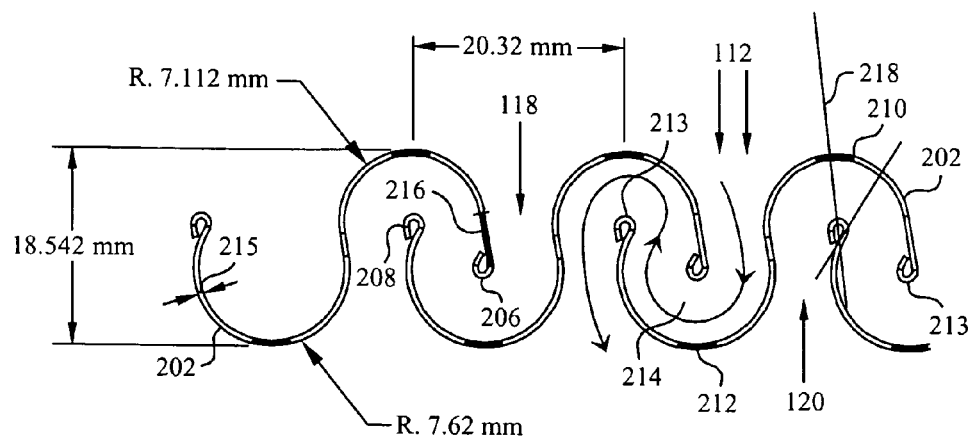
FIG. 6 is a cross-sectional view of a plurality of baffle members according to another embodiment.
Figure 7:
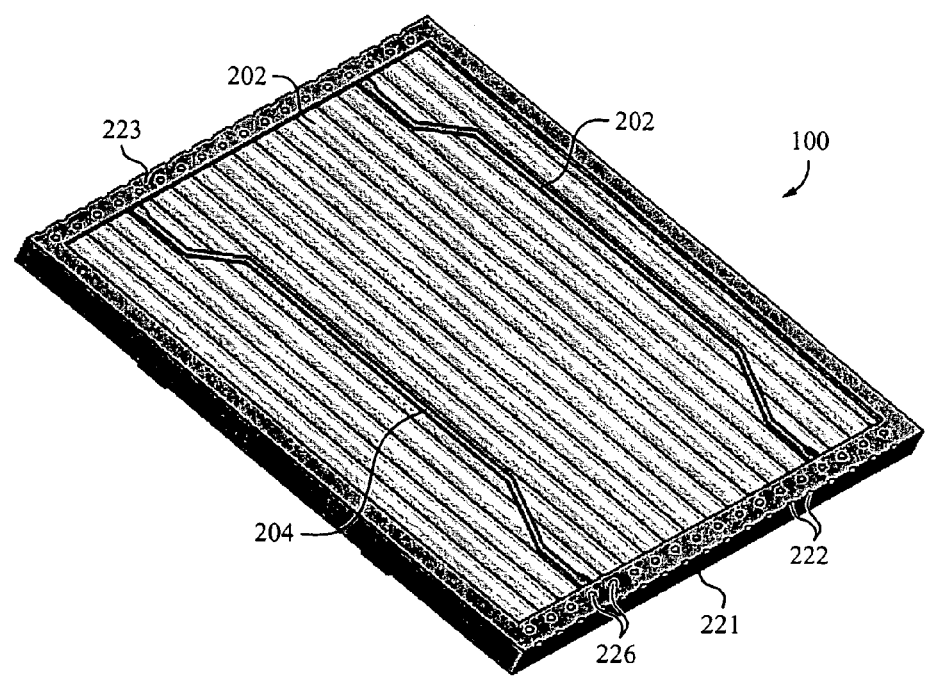
FIG. 7 is a perspective view of a baffle according to another embodiment.

Referring to FIGS. 4–8, another embodiment of baffle 100 is shown. In this embodiment, baffle 100 comprises a frame 220 which encloses and/or holds a plurality of baffle members 202. In one embodiment, frame 220 may comprise openings 222 which allow substances such as grease to drain into trough 82 in hood 80. In another embodiment, frame 220 is coupled to baffle members 202 using rivets 226. Rivets 226 engage baffle members 202 at openings 224. It should be understood that in other embodiments frame 220 may be coupled to baffle members 202 in a variety of suitable permanent or non-permanent ways (e.g., spot welding, tabs on baffle members 202 that correspond to slots in frame 220, etc.). Also, as shown in FIG. 7, baffle 100 may comprise handles 204 which can be used to position baffle 100 between railings 102 and 104.

Figure 4:
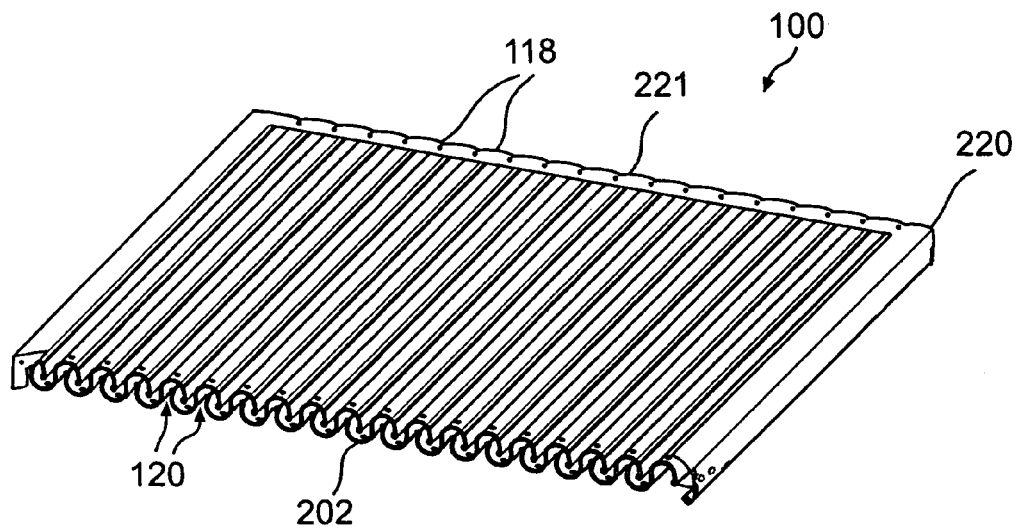
FIG. 4 is a cross-sectional perspective view of a baffle according to another

As shown in FIGS. 4 and 7, frame 220 comprises a first side 221 and a second side 223. Baffle members 202 extend from first side 221 to second side 223 of frame 220. In this embodiment, frame 220 is configured to hold baffle members 202 in a fixed position where each baffle member 202 is substantially parallel to the other baffle members 202.

As shown in FIGS. 4, 5, and 6, baffle members 202 have a substantially S-shaped cross section. When baffle 100 is laid flat in a horizontal plane, as shown again in FIG. 6, each baffle member 202 may be referred to as including a first curved portion or top curve 210 and a second curved portion or bottom curve 212 which together form the S-shaped cross section of baffle members 202. Each baffle member 202 also includes a first edge 206 and a second edge 208. First edge 206 is adjacent to top curve 210 and partially defines an entry opening 118 where exhaust stream 112 enters baffle 100. Second edge 208 is adjacent to bottom curve 212 and partially defines an exit opening 120 where exhaust stream 112 exits baffle 100. Baffle members 202 are arranged so that adjacent baffle members 202 overlap each other. For example, as shown in FIGS. 4–8, top curve 210 of one baffle member 202 is positioned over second edge 208 of an adjacent baffle member 202. Likewise, bottom curve 212 of one baffle member 202 is positioned below first edge 206 of another adjacent baffle member 202. In this manner, baffle members 202 may overlap to define a substantially S-shaped channel 214 through which exhaust stream 112 travels as it passes through baffle 100. In one embodiment, top curve 210 of one baffle member may be positioned over second edge 208 so that first edge 206 extends beyond second edge 208 towards bottom curve 212.

Figure 23:
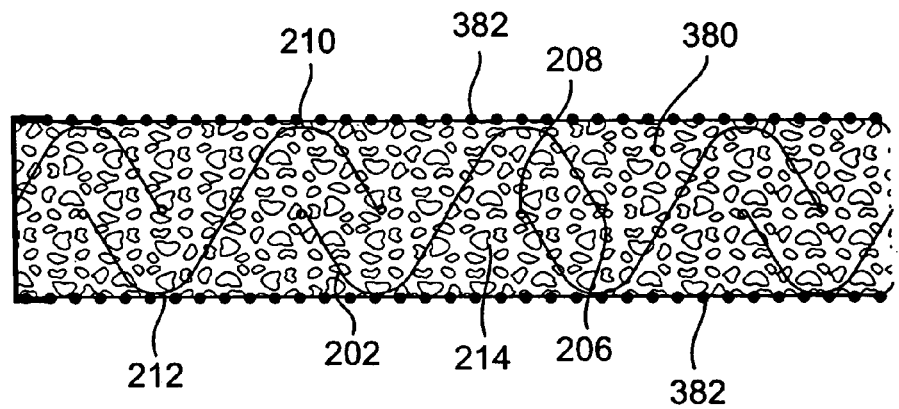
FIG. 23 illustrates a baffle with a filtration media dispersed therein in accordance with an exemplary embodiment.
Figure 24:
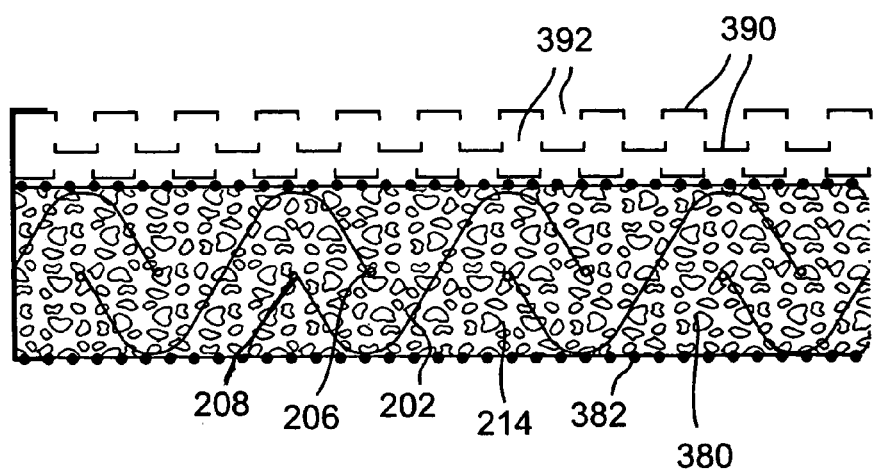
FIG. 24 illustrates a separation cartridge in accordance with an exemplary embodiment.

Referring to FIGS. 23 and 24, a separation media 380 (e.g., porous particles, non-porous particles, fibrous material such as mesh or metal scrim, etc.) may be positioned in the substantially S-shaped channels 214 defined by baffle members 202. Screen 382 may be used to hold separation media 380 in channels 214. Thus, the size of the holes in screen 382 should be smaller than the size of the smallest particle of separation media 380. In one embodiment, separation media 380 may comprise porous, inorganic particles as described in U.S. patent application Ser. No. 10/632,805 ('805 application), entitled "Separation Apparatus," the entire disclosure of which is hereby expressly incorporated by reference, or any of the many other embodiments of separation media 380 described in the '805 application. In alternative embodiments, separation media 380 may be included in other baffles having baffle members that are not substantially S-shaped. For example, a large number of conventional baffles may be filled with separation media 380 to provide additional embodiments of baffle 100.

Referring to FIGS. 5 and 6, first edge 206 and second edge 208 are rounded according to one embodiment. Edges 206 and 208 may be rounded by bending baffle member 202 at edges 206 and/or 208 in a small loop. In another embodiment, edges 206 and/or 208 may be rounded by folding edges 206 and/or 208 over on itself so that no loop is formed. In this embodiment, a rounded portion 213 of edges 206 and/or 208 is typically smaller than the rounded portion of edges 206 and/or 208 where a loop is formed. In one embodiment, the radius of rounded edges 206 and 208 is at least approximately 1.5 times (or 2 times, 2.5 times, or 3 times) the cross sectional thickness 215 of baffle member 202. In another embodiment, the radius of rounded edges 206 and 208 is at least approximately 0.38 millimeters (or 0.51 millimeters or 0.63 millimeters). While not wishing to be bound by theory, it is thought that rounding edges 206 and 208 reduces the size and/or number of eddies and/or areas of turbulent flow; which, consequently, may decrease the pressure drop across baffle 100. Of course, in other embodiments, edges 206 and/or 208 may not be rounded.

In another embodiment, first edge 206 includes a linear portion 216, and second edge 208 is substantially continually curved. As shown in FIG. 6, linear portion 216 begins at a point where the curvature from top curve 210 ends and extends to rounded portion 213 of first edge 206. However, second edge 208 is substantially continually curved so that bottom curve 212 naturally flows into rounded portion 213 of second edge 208. Also, it should be noted that second edge 208 curves beyond a plane 218 that is normal to the center of top curve 210. Thus, while not wishing to be bound by theory, it is thought that second edge 208 directs exhaust stream 112 against top curve 210 in a more forceful manner than if second edge 208 was not curved beyond plane 218, thereby increasing the efficiency at which substances in exhaust stream 112 are captured.

In another embodiment, top curve 210 and bottom curve 212 may comprise the same or varying radiuses. For example, the radius of top curve 210 may vary from approximately 3 mm to approximately 15 mm, desirably from approximately 6 mm to approximately 9 mm, or suitably from approximately 7 mm to approximately 8 mm. In another embodiment, the distance between the center of top portions 210 of adjacent baffle members 202 may be between approximately 5 mm and approximately 100 mm, or, desirably, between approximately 10 mm and approximately 50 mm, or, suitably, between approximately 15 mm and approximately 30 mm. In still another embodiment, the width of baffle 100 may be 10 mm to 30 mm. Baffle 100 may be included as part of a separation cartridge which also includes another separation medium (e.g., a packed bed). Of course, in another embodiment, baffle 100 may be configured to be a suitable size to fit between upper and lower railings 102 and 104.

Figure 8:
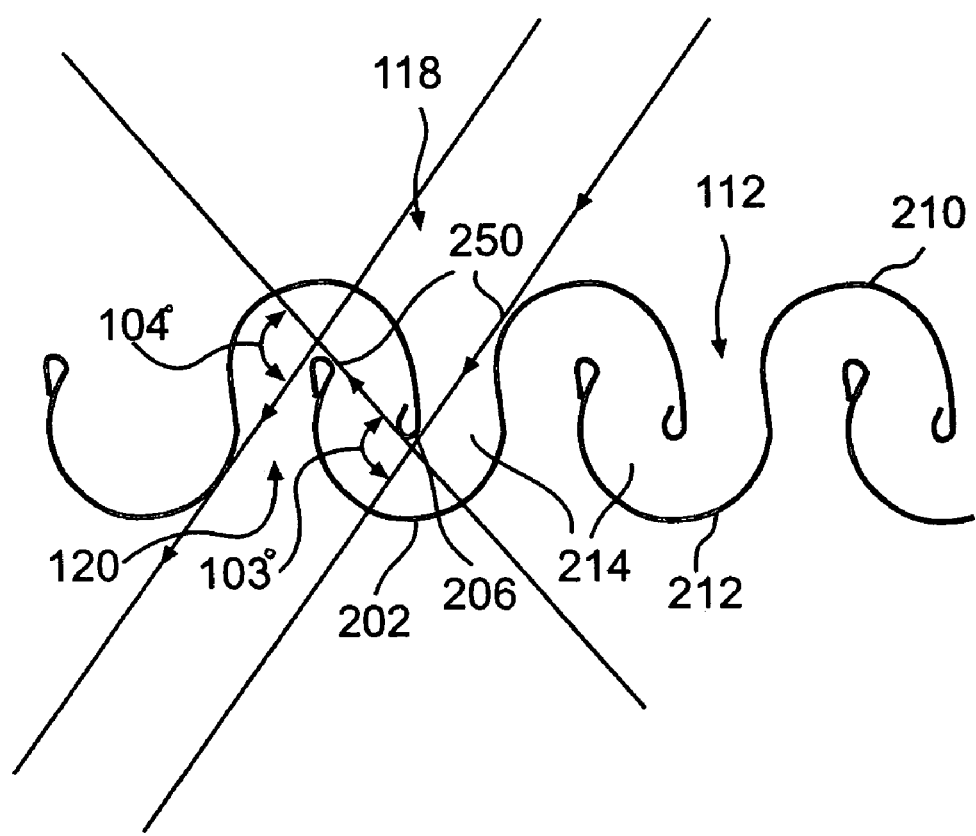
FIG. 8 is a cross-sectional view of a plurality of baffle members according to another embodiment.

Referring to FIG. 8, the minimum extent to which a substance must be deflected to pass through channel 214 is shown. A particle traveling along pathway 250 is deflected the minimum amount because the particle enters opening 118 at an angle where the particle would be deflected the least amount as it passes first edge 206. Pathway 250 is the line with arrows indicating the direction that the particle travels. In order for a particle to pass first edge 206, second edge 208, and pass out of opening 120 of the embodiments shown in FIG. 8, the particle must be deflected at least 207 degrees. A similar analysis may be performed on a wide variety of baffles to provide a comparison with baffle 100. Accordingly, in one embodiment, the minimum extent to which a substance must be deflected to pass through channel 214 is at least approximately 180 degrees, or, desirably, at least approximately 190 degrees, or, suitably, at least approximately 205 degrees.

Figure 9:
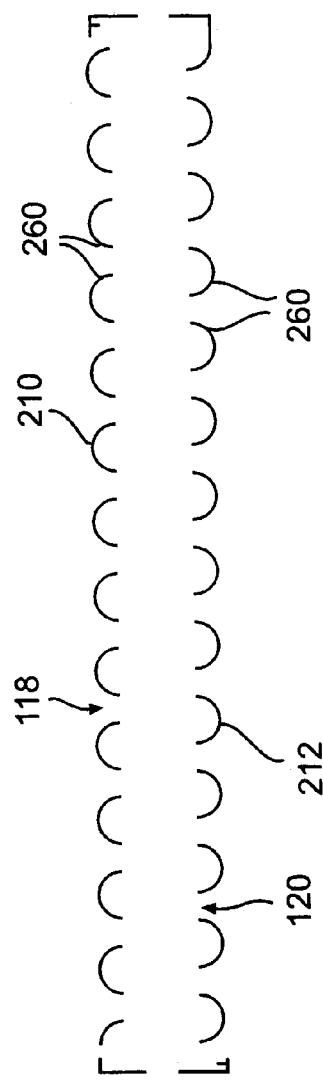
FIG. 9 is a cross-sectional view of two sheets of metal formed into opposing U shaped members according to one embodiment.
Figure 10:
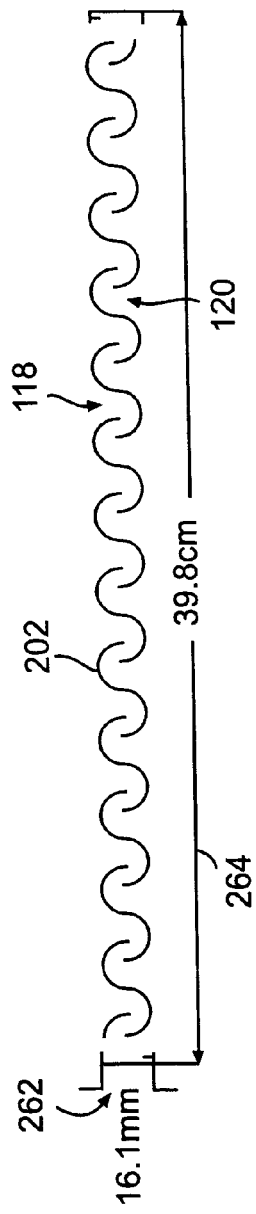
FIG. 10 is a cross-sectional view of a baffle according to another embodiment.

Referring to FIGS. 9 and 10, baffle 100 is shown at various stages in a process used to make baffle 100, according to one embodiment. Baffle 100 made according to FIGS. 9 and 10 comprises baffle members 202 which have a substantially s-shaped cross section. The first step in the process of making baffle 100 is to provide two sheets of sheet metal. The sheets are initially cut in locations that correspond to openings 118 and 120. Portions 260, which are adjacent the cuts are then bent to form top curves 210 and bottom curves 212, as shown in FIG. 9. Top curves 210 and bottom curves 212 are then brought together (e.g., spot welded, riveted, etc.) in an offset manner to form baffle members 202, as shown in FIG. 10. One piece of sheet metal was used to supply top curves 210 and the other piece of sheet metal was used to supply bottom curves 212. In one embodiment, the width 262 of baffle 100 made using this process is approximately 16 millimeters and the length 264 is approximately 40 centimeters. In general, it should be noted that the width of baffle 100 is proportional to the spacing of openings 118 and 120 when using this process. Therefore, as the distance between the center points (i.e., the distance between adjacent cuts in the sheet metal) of adjacent openings 118 is increased, the width 262 of baffle 100 is also increased and vice versa. In other embodiments, each baffle member 202 may be made out of a single piece of metal.

FIGS. 11A–11G show various other baffle members 202 which have a substantially S-shaped cross section according to other embodiments. The substantially S-shaped cross-section can be a true S-shape, Z-shape; or variation of the same. In general, FIGS. 1A–11G show the cross sections of a plurality of baffle members 202 in a horizontal plane. From FIGS. 11A–11G it should be noted that there are a wide variety of shapes and configurations for baffle members 202 that may be used to separate an entrained substance from exhaust stream 112. Also, the various features of the embodiments of baffle members 202 described previously apply equally to those baffle members 202 shown in FIGS. 11A–11G (e.g., the edges may be rounded, etc.).

Figure 11A:
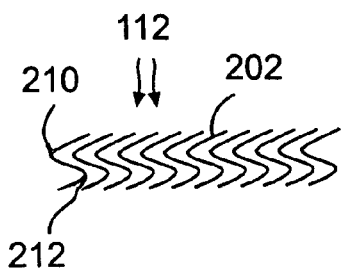
FIGS. 11A–11H are cross-sectional views of various embodiments of substantially S-shaped baffle members.
Figure 11B:
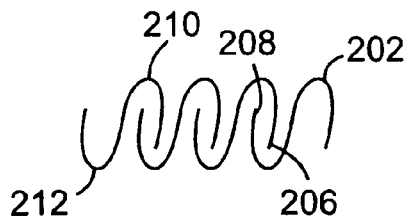
Figure 11C:
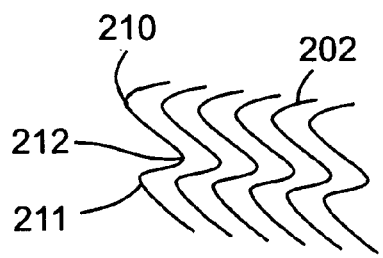

FIGS. 11A and 11C show overlapping baffle members 202 having a substantially S-shaped cross section according to one embodiment. In FIGS. 11A and 11C, baffle members 202 are generally shaped as substantially vertical S-shapes positioned in close proximity to each other so that exhaust stream 112 is deflected as it passes between baffle members 202. Baffle members 202 in FIG. 11A are slightly smaller than baffle members in FIG. 11C. Also, baffle members 202 in FIG. 11C comprise three curves (top curve 210, bottom curve 212, and third curve 211) and baffle members 202 in FIG. 11A comprise two curves (e.g., top curve 210 and bottom curve 212).

Figure 11D:
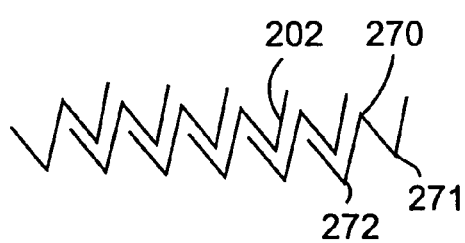
Figure 11E:
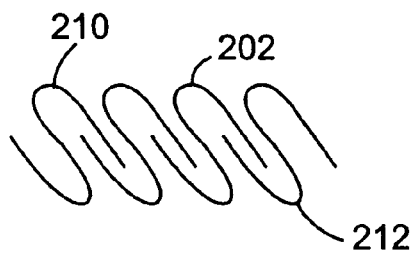

FIGS. 11B and 11E show overlapping baffle members 202 having a substantially S-shaped cross section according to further embodiments. Baffle members 202 in FIG. 111B are generally similar to baffle members 202 shown in FIG. 6 except that baffle members 202 in FIG. 11B are tilted slightly to the right as though bottom curves 212 were held still and top curves 210 were moved slightly to the right. Also, first and second edges 206 and 208 are rounded in FIG. 11B. FIG. 11E is similar to FIG. 11B except that in FIG. 11E, baffle members 202 are titled to the left as though bottom curves 212 were held still and top curves 210 were moved slightly to the left.

FIG. 11D shows overlapping baffle members 202 having a substantially S-shaped cross section according to another embodiment. In this embodiment, baffle members 202 comprise top angles 270, bottom angles 272, and third angles 271. Unlike previous embodiments which comprise curves 210, 212, and/or 211, angles 210, 212, and/or 211 in FIG. 11D make sharp turns to form the substantially S-shaped baffle members 202.

Figure 11F:
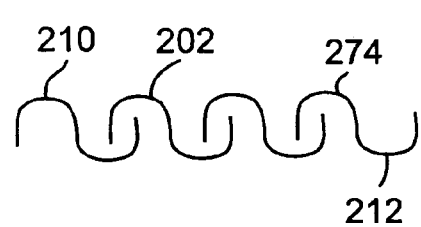
Figure 11G:

FIGS. 11F and 11G show overlapping baffle members 202 having a substantially S-shaped cross section according to further embodiments. Baffle members 202 in FIGS. 11F and 11G are generally similar to baffle members 202 shown in FIG. 6 except that top curves 210 and bottom curves 212 of baffle members 202 in FIGS. 11F and 11G are generally shaped similar to a U with substantially flat bottom portions 274. FIG. 11G is a mirror image of FIG. 11F.

Figure 11H:
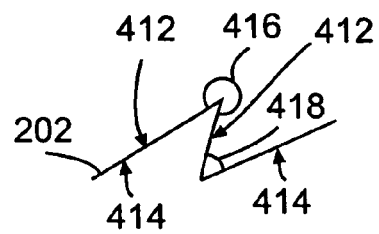

FIG. 11H shows a cross sectional view of a single baffle member 202 which includes a first surface 412 and a second surface 414. Baffle member 202 is bent in two places at two angles. To form the desired shape, a first angle 416 is greater than 180 degrees and a second angle 418 is less than 180 degrees. As shown in FIG. 11H, the first and second angles 416 and 418 are measured from the first surface of one bend to the first surface on the adjacent bend to provide a uniform method of measuring angles 416 and 418. This measurement can be applied to both the curved baffle members and angular baffle members.

Figure 12:
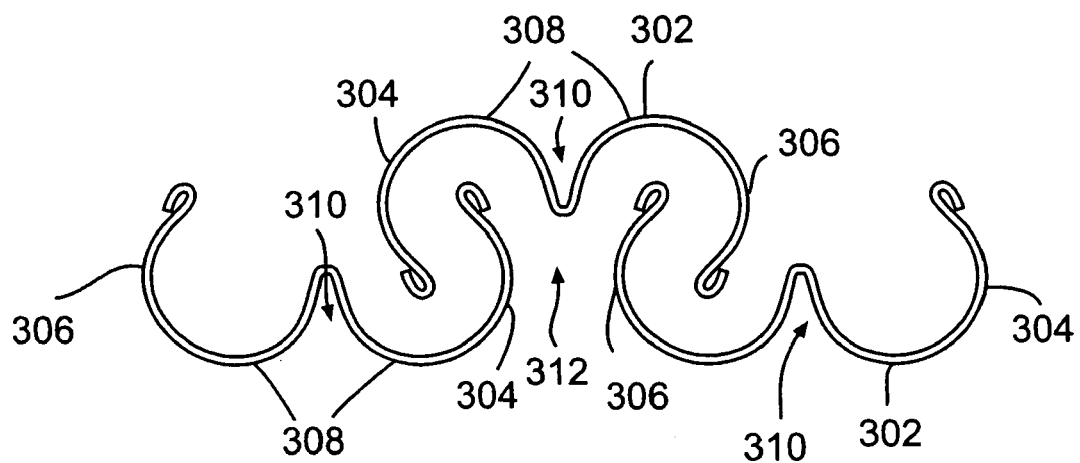
FIGS. 12–15 are cross-sectional views of various embodiments of baffle members.
Figure 13:
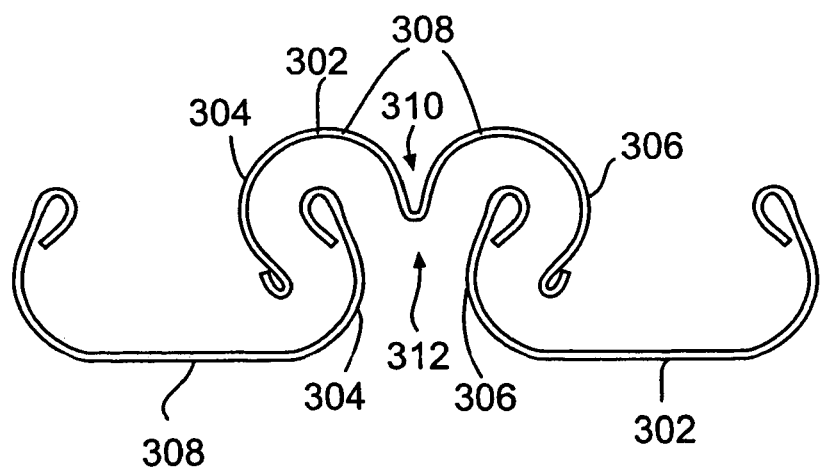

Referring to FIG. 12, overlapping baffle members 302 are shown according to another embodiment. Baffle members 302 may be generally described as having a cross section that is shaped similar to two conjoined U-shapes where the open portions of the U-shapes face the same direction. This is in contrast to some of the embodiments of baffle members 202 where the two conjoined U-shapes have open portions that face in opposite directions and form an S-shape. As shown in FIG. 12, baffle members 302 are arranged in at least two offset and opposed rows where a first side wall 304 and a second side wall 306 of one baffle member 302 extend toward first side walls 304 and second side walls 306 of the opposed baffle members 302. In the embodiment shown in FIG. 12, all of baffle members 302 also comprise a base 308 which includes a recess 310. Recess 310 extends toward a space 312 which is between first side wall 304 of one adjacent opposed baffle member 302 and second side wall 306 of another adjacent opposed baffle member 302. In the embodiment shown in FIG. 13, only one row of baffle members 302 comprise recess 310 in base 308. The other baffle members 302 comprise a generally flat base 308. Of course, any suitable combination of baffle members 302 having a generally flat base 308 and a recessed based 308 may be used.

Figure 14:
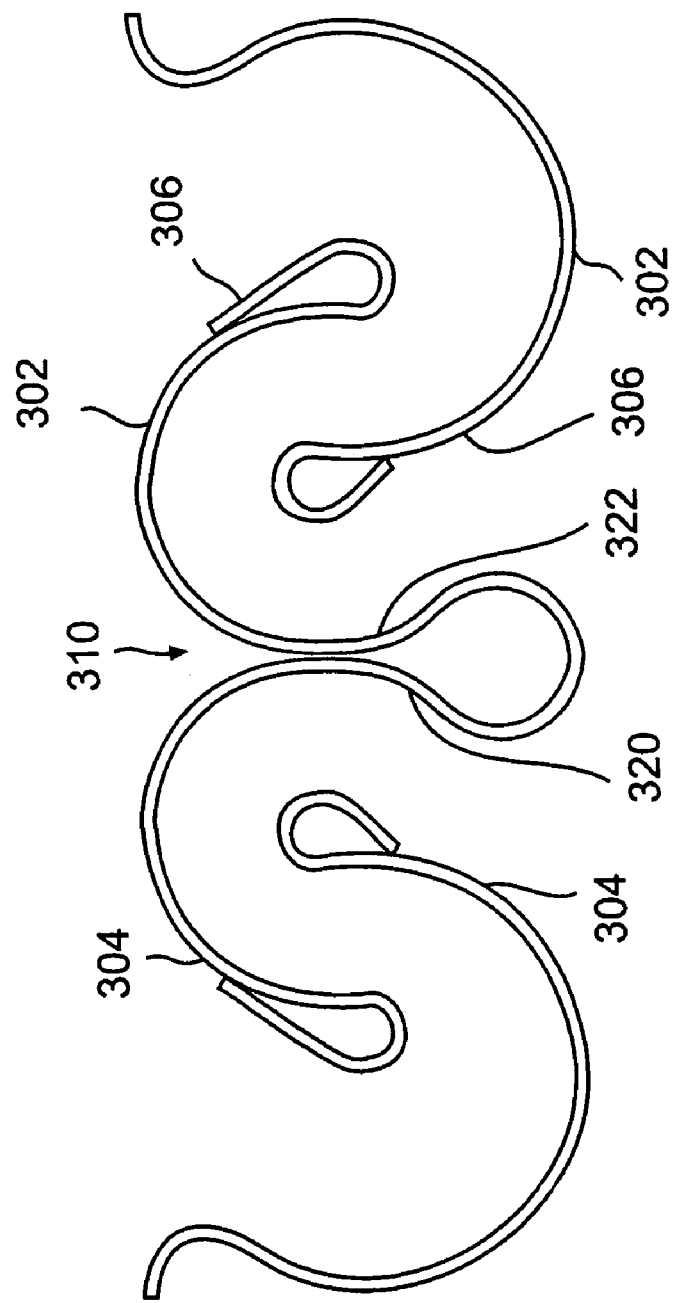

Referring to FIG. 14, another embodiment of baffle members 302 is shown. This embodiment is similar to those embodiments described in connection with FIGS. 12 and 13 in that baffle members 302 can generally be described as having a cross section that is shaped similar to two conjoined U-shapes where the open portions of the U-shapes face the same direction. However, in this embodiment, recess 310 is larger than in FIGS. 12 and 13. Enlarging recess 310 extends third and fourth walls 320 and 322 to a position where walls 320 and 322 are positioned between first side wall 304 of one adjacent opposed baffle member 302 and second side wall 306 of another adjacent opposed baffle member 302.

Figure 15:
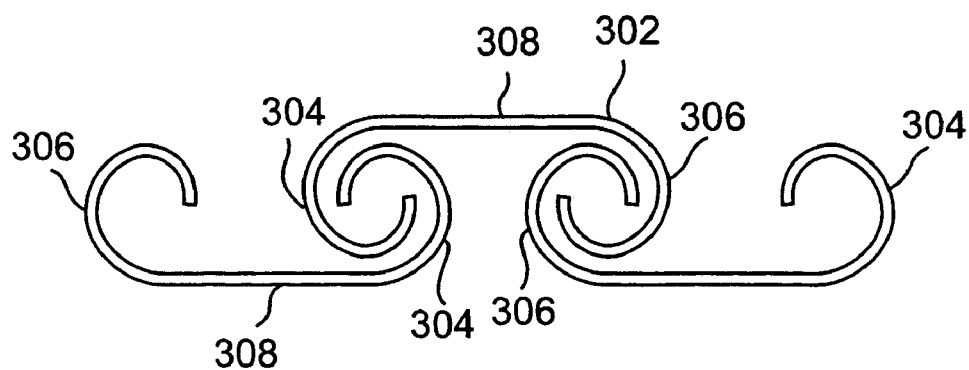

Referring to FIG. 15, another embodiment of baffle members 302 is shown. In this embodiment, baffle members 302 comprise first side wall 304, second side wall 306, and base 308. The first and second side walls 304 and 306 generally extend outwardly from the same side of base 308. Baffle members 302 are generally arranged in at least two opposed rows where first side wall 304 of one baffle member 302 extends toward and overlaps first side wall 304 of another baffle member 302 in an interlocking relationship and second side wall 306 of the one baffle member 302 extends toward and overlaps second side wall 306 of yet another baffle member 302.

Figure 16:
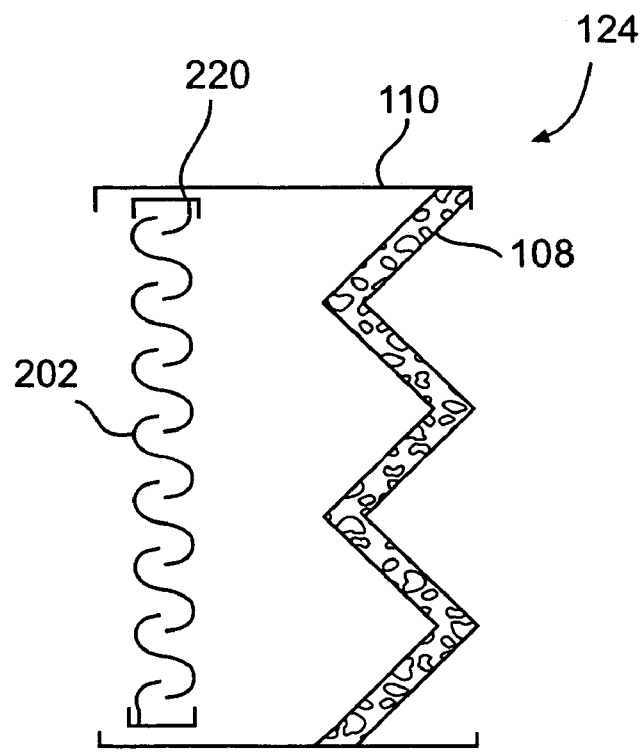
FIG. 16 is a cross-sectional view of a separation cartridge according to one embodiment.

In one embodiment, baffle 100 may be combined with other separation mediums to form a separation cartridge 124, as shown in FIG. 16. In general, separation cartridge 124 comprises baffle 100, an additional separation medium, and frame 110. In one embodiment, the additional separation medium may be a packed bed 108. Baffle 100 may be configured to initially separate substances out of exhaust stream 112. After passing through baffle 100, the other separation medium may separate all or a portion of the remaining substances from exhaust stream 112. Of course, any of the embodiments and configurations described in U.S. patent application Ser. No. 10/632,805, entitled "Separation Apparatus," may also include baffle 100. For example, with reference to FIG. 24, a plurality of perforated plates 390 having openings 392 may be used in conjunction with baffle 100 to form another embodiment of separation cartridge 124. As shown in FIG. 24, openings 392 of one plate 390 are offset with respect to openings 392 of an adjacent plate 390. Also, separation media 380 may be positioned in channels 214 to provide additional separation capabilities. In other embodiments, baffle 100 may be used in combination with another separation medium which is positioned adjacent to or distant from baffle 100 in the ventilation system.

EXAMPLE 1

Figure 17:
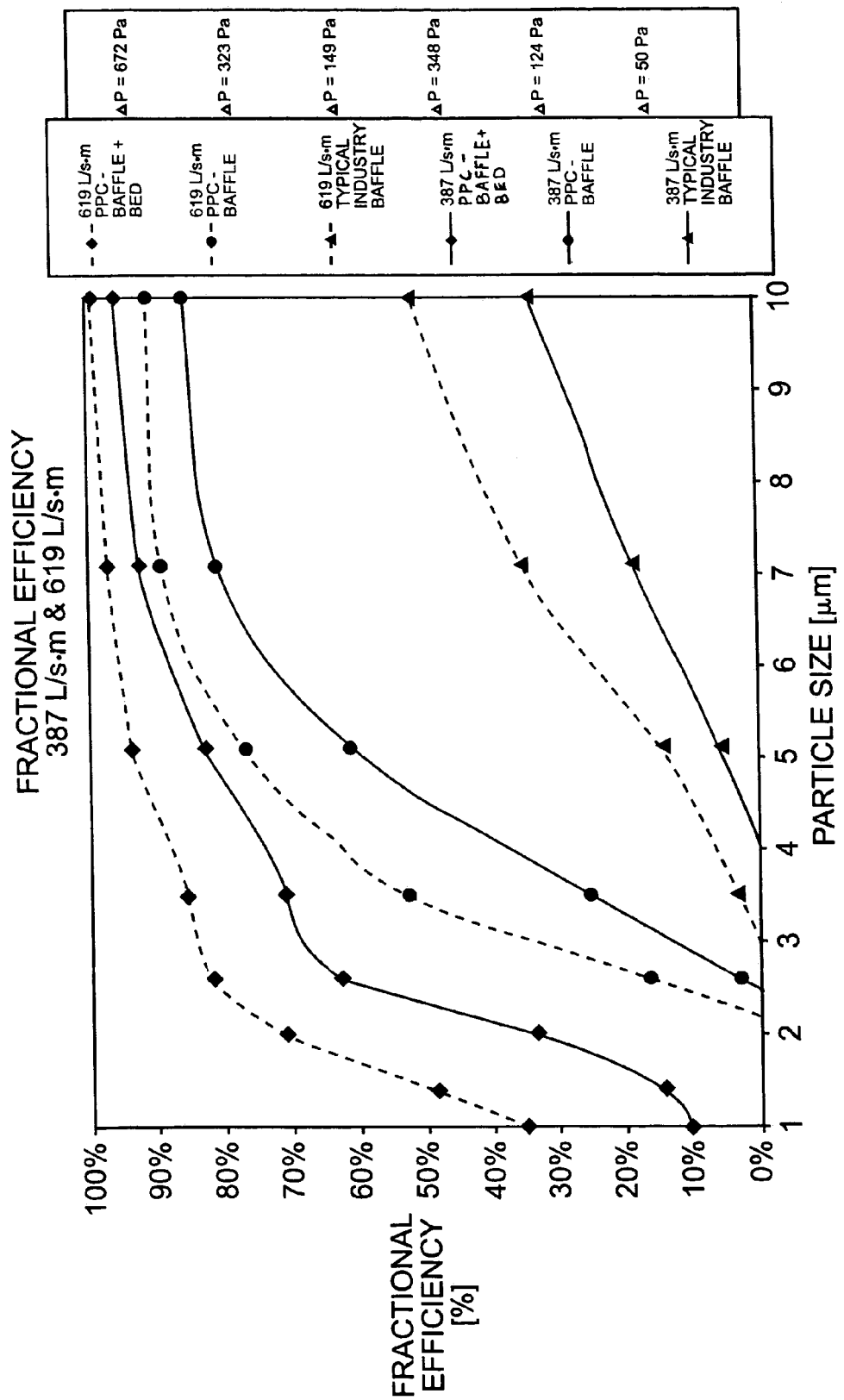
FIG. 17 is a graph of the fractional efficiency of various embodiments of a baffle as well as for a conventional baffle.

Referring to FIG. 17, a graph is shown of the separation efficiency versus particle size for various embodiments of separation cartridges as well as for a conventional baffle at two different air flow rates. In particular, the fractional efficiency of baffle 100 (all references to baffle 100 in this example refer to the embodiment shown in FIGS. 4–8) alone and in combination with a second separation medium comprising a packed bed 108 are shown. The procedure used to obtain the data in FIG. 17 is as follows.

A standard sized 1.22 meter hood was used to acquire the efficiency data. The hood is approximately 41 cm between rails 102 and 104 and is configured to hold three approximately 41 cm by approximately 41 cm baffles. 4.57 meters of straight, 40.64 cm diameter, round duct connects the hood to an exhaust fan. The exhaust fan is a standard exhaust fan available from Loren Cook Co., Springfield, Mo. 65808. The flow of exhaust through the hood is selectively adjustable to a number of suitable exhaust flows.

The first step in performing the efficiency testing is to set the fan speed to achieve the desired flow rate of exhaust stream 112. The flow rate of exhaust stream 112 may be calculated by measuring the velocity in the duct with an appropriate measuring device such as a pitot tube or anemometer and then multiplying that velocity by the known cross sectional area of the duct.

In this example, oleic acid is used as an artificial emission material to introduce into exhaust stream 112. An atomizer is positioned below an opening in the hood where the baffles sit. An optical particle counter, available from Pacific Scientific Instruments, 481 California Ave., Grants Pass, Oreg. 97526, is used to size and count the oleic acid particles. An appropriate sized sampling nozzle to obtain isokinetic sampling conditions is placed in the center of the duct, eight duct diameters downstream from the hood. If necessary, a diluter is attached to the particle counter so the concentration of particles does not exceed the maximum concentration for the particle counter as specified by the manufacturer. The particle counter has eight channels or bins for different size particles. Although the optical particle counter can sense particles between 0.3 and 20 microns, the bins are selected to be within the range of 0.9 to 10 microns.

Initial samples are taken of the particle count in exhaust stream 112 to obtain a baseline without a separation apparatus in place. The counter samples the particles five times for a duration of one minute each time to obtain an average. The various separation cartridges being tested are then placed in the hood without changing the atomizer. The fan is adjusted to obtain the same flow rate at which the baseline was obtained. Once the flow rate is adjusted, the counter may sample another five times to obtain an average. This procedure is performed at two flow rates: 387 L/s*m and 619 L/s*m. The baseline is then compared to the particle counts with various baffles in place to obtain a percentage efficiency based on the eight different particle sizes identified by the 8 bins in the particle counter. FIG. 17 can then be established using this data.

In FIG. 17, the dashed lines refer to data obtained at a flow rate of 619 L/s*m and the solid lines refer to data obtained at a flow rate of 387 L/s*m. One trend that can be seen in the graph is that the higher flow rate generally results in higher efficiencies for all of the tested items. The conventional baffles failed to realize efficiencies that were much above 50% for 10 micron particles and had 0% efficiency for particles below 3 microns. By contrast, baffle 100, realized an efficiency of about 85% at 387 L/s*m and 95% at 619 L/s*m for 10 micron particles. Also, the efficiency of baffle 100 for 5 micron particles was 60% at 387 L/s*m and 80% at 619 L/s*m. The efficiency of baffle 100 was negligible for particles smaller than 2.5 microns at the lower flow rate and was 30% for 2 micron particles at the higher flow rate. Baffle 100 combined with a packed bed provided even greater efficiency. Specifically, at the lower flow rate, the addition of the packed bed increased the efficiency overall by approximately 10–20% and, at the higher flow rate, the addition of packed bed 108 increased the efficiency overall by approximately 4–5% for particles above 7 microns and 10–20% for particles below 7 microns.

The pressure drop over the conventional baffle is 149 pascals and 50 pascals for the high and low flow rates, respectively. The pressure drop over baffle 100 by itself is 323 pascals and 124 pascals for the high and low flow rates, respectively. The pressure drop over the combination of baffle 100 and packed bed 108 is 672 pascals and 348 pascals for the high and low flow rates, respectively.

EXAMPLE 2

Figure 18:
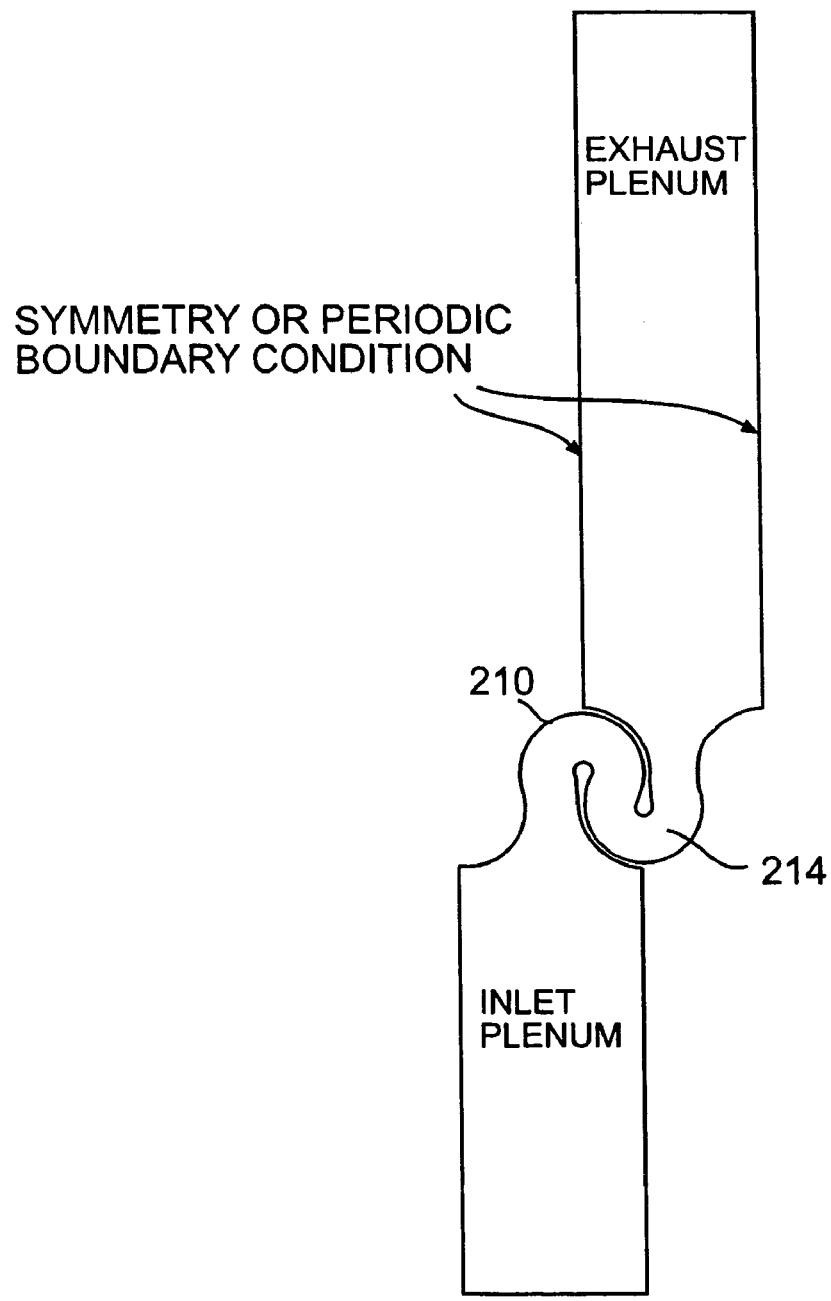
FIG. 18 is a diagram of a simulated baffle geometry.
Figure 19:
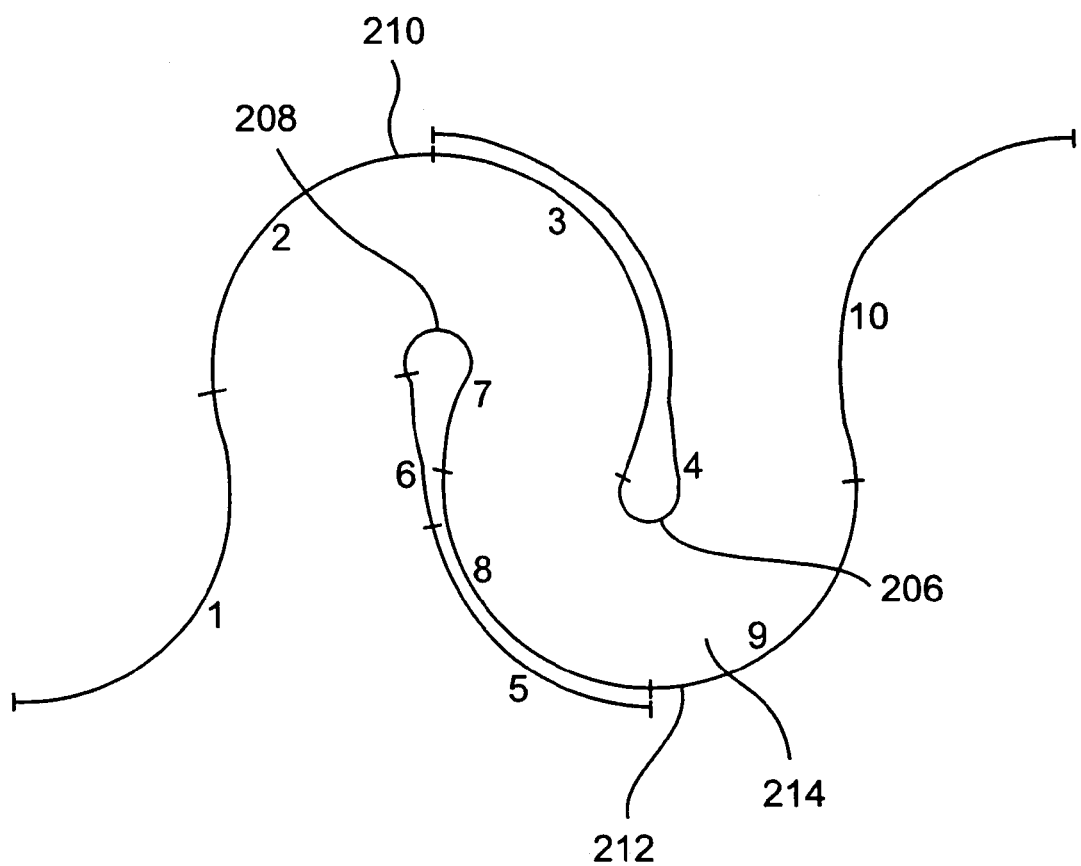
FIG. 19 is a diagram of a plurality of baffle members showing the zones where particles may be deposited as the particles pass between the baffle members.

A Discrete Phase Model (DPM) in the FLUENT computational fluid dynamics (CFD) software (version 6.1.18, Windows XP) is used to simulate the trajectories of particles through baffle 100 having baffle members 202 with a substantially S-shaped cross section. The objective was to determine the particle deposition efficiency and deposition locations in the baffle. The cross-section of baffle members 202 is shown in FIGS. 18 and 19, along with numbered zones. The simulation conditions are shown in Table 1 and the calculated fraction of particles deposited in each zone are reported in Tables 2 and 3, for average inlet flow velocities of 0.955 m/s and 1 m/s, respectively. The numbers in Tables 2 and 3 indicate the number of particles out of 1000 that are deposited in each zone for each particle size. The total at the bottom of the table is the sum for all zones.

TABLE 1

| | |
|---|---|
| FLUENT version | 6.1.18, Windows XP |
| Inlet velocity | 0.955, 1 m/s |
| Inlet-lower baffle distance | 2 in. |
| Upper baffle-outlet distance | >3 in. |
| Viscous model | Laminar flow |
| Fluid | air |
| Particle size | 1, 2, 3, 4, 5, 6, 7, 8, 9, 10, 11, 12, 13 μm |
| Particle density | 0.89 gm/cm$^3$ |
| Particle trajectories | 1000 for each particle size |

TABLE 2a

| Baffle zone | \multicolumn{13}{c}{Particle size (symmetry boundary, 0.955 m/s) [μm]} |
|---|---|---|---|---|---|---|---|---|---|---|---|---|---|
| | 1 | 2 | 3 | 4 | 5 | 6 | 7 | 8 | 9 | 10 | 11 | 12 | 13 |
| Incomplete | | | | | | | | | | | | | 1 |
| 1 | | | | | | | | | | | 8 | 62 | 142 |
| 2 | | | | | | | | | | | | | |
| 3 | 7 | 9 | 20 | 43 | 92 | 181 | 313 | 517 | 880 | 1000 | 992 | 938 | 857 |
| 4 | | | | | 2 | 6 | 14 | 22 | 51 | | | | |
| 5 | | | | | | | | | | | | | |
| 6 | | | | | | | | | | | | | |
| 7 | | | | | | | | | | | | | |
| 8 | | | | | | | | | | | | | |
| 9 | | | | | | | | 664 | 461 | 69 | | | |
| 10 | | | | | | 80 | 9 | | | | | | |
| Total | 7 | 9 | 20 | 43 | 94 | 267 | 1000 | 1000 | 1000 | 1000 | 1000 | 1000 | 1000 |

TABLE 2b

| Baffle zone | \multicolumn{13}{c}{Particle size (periodic boundary, 0.955 m/s) [μm]} |
|---|---|---|---|---|---|---|---|---|---|---|---|---|---|
| | 1 | 2 | 3 | 4 | 5 | 6 | 7 | 8 | 9 | 10 | 11 | 12 | 13 |
| Incomplete | | | | | | | | | | | 6 | 40 | 71 |
| 1 | | | | | | | | | | | 15 | 39 | 84 |
| 2 | | | | | | | | | | | | | |
| 3 | 7 | 9 | 20 | 43 | 92 | 181 | 313 | 516 | 875 | 1000 | 979 | 921 | 845 |
| 4 | | | | | 3 | 6 | 13 | 22 | 53 | | | | |
| 5 | | | | | | | | | | | | | |
| 6 | | | | | | | | | | | | | |
| 7 | | | | | | | | | | | | | |
| 8 | | | | | | | | | | | | | |

TABLE 2b-continued

| | Particle size (periodic boundary, 0.955 m/s) [μm] | | | | | | | | | | | | |
|---|---|---|---|---|---|---|---|---|---|---|---|---|---|
| Baffle zone | 1 | 2 | 3 | 4 | 5 | 6 | 7 | 8 | 9 | 10 | 11 | 12 | 13 |
| 9 | | | | | | 103 | 659 | 462 | 72 | | | | |
| 10 | | | | | | 37 | 15 | | | | | | |
| Total | 7 | 9 | 20 | 43 | 95 | 224 | 1000 | 1000 | 1000 | 1000 | 1000 | 1000 | 1000 |

The flow through the baffles is simulated as laminar flow because the inlet Reynolds number was about 1300. A representative simulation domain for the simulation must be chosen. The baffle geometry shown in FIG. 19 is repeated about 12–14 times, producing periodic boundary conditions in the exhaust plenum (see FIG. 18). However, the existence of walls on either side of baffle 100 means that only a few baffle members 202 in the center of baffle 100 have periodic boundaries that are not significantly affected by the walls of the ductwork. Because we are only interested in the particle deposition efficiency within baffle 100, the boundary conditions used in the exhaust plenum, whether symmetry or periodic boundaries, do not significantly affect the simulated particle deposition efficiency within each baffle member 202. Because it is easier to do simulations with symmetry boundary conditions, unless otherwise noted, all results are shown for simulations with symmetry boundary conditions in the exhaust plenum and for an inlet velocity of 0.955 m/s. To demonstrate the weak effect of the boundary condition on simulated particle deposition efficiency, simulations for periodic boundary conditions in the exhaust plenum are also performed. The results for both boundary conditions are reported in Table 2a and 2b. Table 3 shows deposition efficiency for symmetry boundary conditions in the exhaust plenum and for an inlet velocity of 1 m/s, just 5% higher than the target velocity of 0.955 m/s. The results shown in Table 3 show that a 5% difference in the inlet velocity has a greater effect on the simulated deposition efficiency than the choice of boundary condition in the exhaust plenum. Therefore, symmetry boundary conditions are used in the exhaust plenum.

Figure 20A:
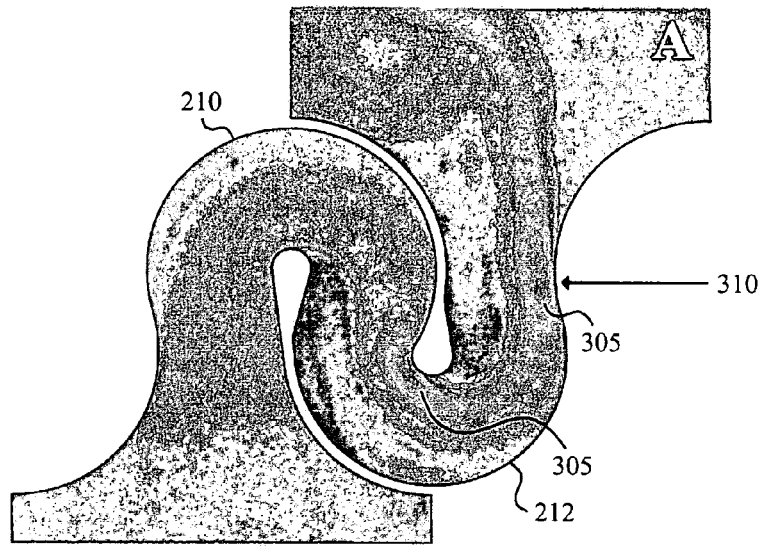
FIGS. 20A–20B are diagrams of the simulated velocity magnitudes of an exhaust stream as it passes between a plurality of baffle members at various boundary conditions.
Figure 20B:
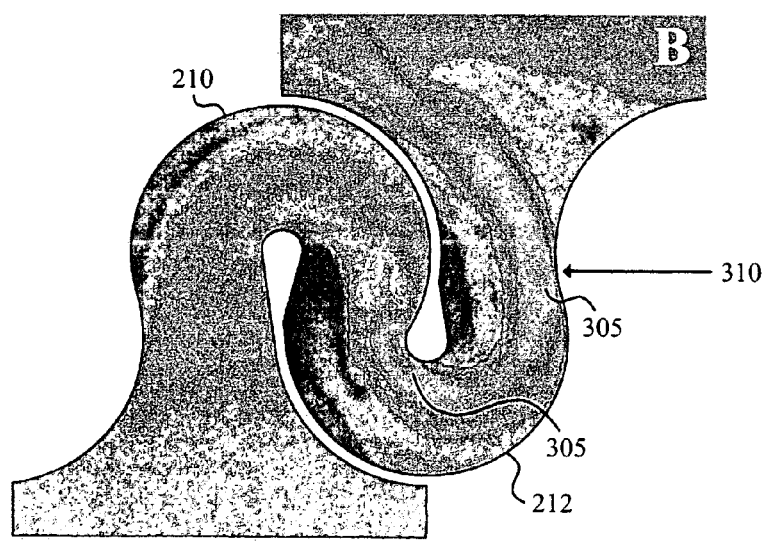
Figure 21:
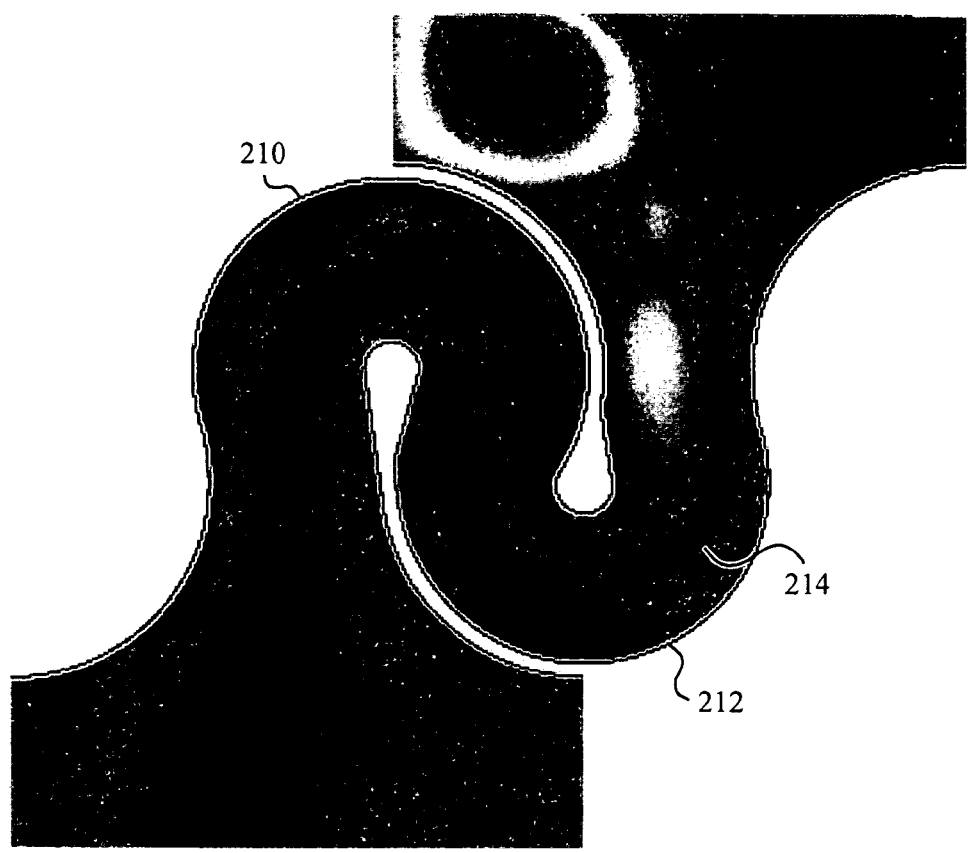
FIG. 21 is a diagram of the simulated stream lines of an exhaust stream as it passes between a plurality of baffle members.
Figure 22A:
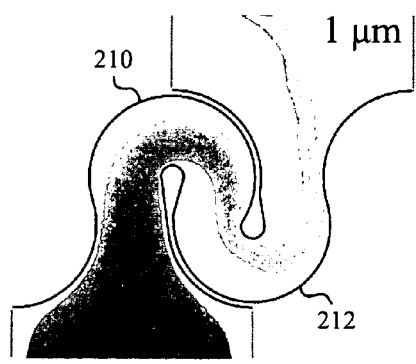
FIGS. 22A–22D show the simulated particle trajectories for various sizes of particles as they pass between a plurality of baffle members.
Figure 22B:
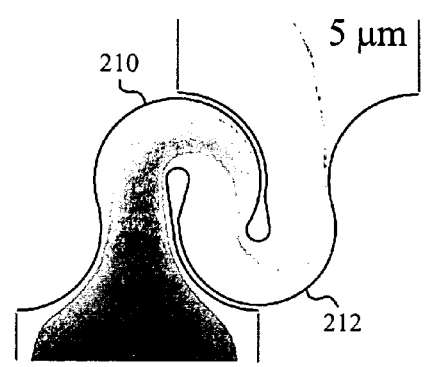
Figure 22C:
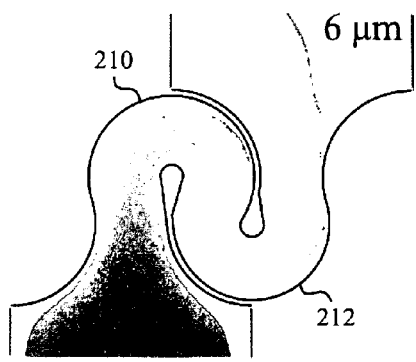
Figure 22D:
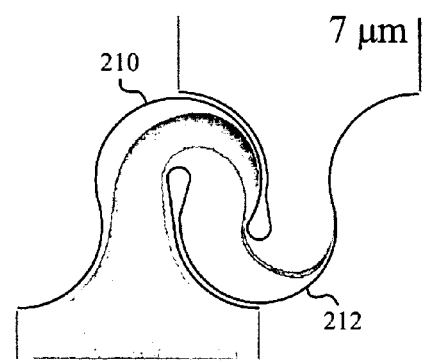

FIG. 20A shows velocity magnitudes using symmetry boundary conditions, and FIG. 20B shows velocity magnitudes using periodic boundary conditions. The lighter areas generally represent higher velocities while the darker areas represent lower velocities. However, areas 305 refer to portions where the darker areas represent higher velocities and the lighter areas represent lower velocities. FIGS. 20A and 20B indicate that up to the mark indicated by arrow 310, there is no significant difference in the simulated velocity magnitude between symmetry and periodic boundary conditions. FIG. 21 shows stream lines as exhaust stream 112 passes through channel 214 of baffle 100.

Referring to FIGS. 22A–22D, particle trajectories are simulated for 1000 injection points spaced uniformly across the inlet plane of the system. Particle sizes were varied from 1 to 13 microns in increments of 1 micron. FIGS. 22A–22D show 1000 particle trajectories for particle diameters of 1, 5, 6, and 7 microns, respectively, FIGS. 22A–22D show that from 5 to 7 microns the particle deposition efficiency goes from near 0 to 100%. Table 2 indicates that approximately 50% of the 6 micron particles are removed and that there is no significant difference between assuming either symmetry or periodic boundary conditions in the exhaust plenum. Table 2 also indicates that smaller particles penetrate the system and deposit in the exit portion of channel 214, whereas larger particles deposit on the upper part of the initial bend. Table 3 indicates that with a modest increase in velocity, a larger fraction of 6 micron particles are captured, and that they are captured in the exit portion of channel 214.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art that these terms are intended to allow a description of certain features described and claimed without restricting the scope of these features to the precise numerical ranges, etc. provided. Accordingly, these terms should be interpreted as indicating that insubstantial or inconsequential modifications or alterations of the

TABLE 3

| | Particle size (symmetry, 1 m/s) [μm] | | | | | | | | | | | | |
|---|---|---|---|---|---|---|---|---|---|---|---|---|---|
| Baffle zone | 1 | 2 | 3 | 4 | 5 | 6 | 7 | 8 | 9 | 10 | 11 | 12 | 13 |
| Incomplete | | | | | | | | | | | 18 | 62 | 72 |
| 1 | | | | | | | | | | 3 | 24 | 53 | 120 |
| 2 | | | | | | | | | | | | | |
| 3 | 8 | 10 | 23 | 48 | 101 | 196 | 344 | 564 | 983 | 997 | 958 | 885 | 808 |
| 4 | | | | | | 3 | 6 | 13 | 24 | 17 | | | |
| 5 | | | | | | | | | | | | | |
| 6 | | | | | | | | | | | | | |
| 7 | | | | | | | | | | | | | |
| 8 | | | | | | | | | | | | | |
| 9 | | | | | | 773 | 643 | 412 | | | | | |
| 10 | | | | | 21 | 25 | | | | | | | |
| Total | 8 | 10 | 23 | 48 | 125 | 1000 | 1000 | 1000 | 1000 | 1000 | 1000 | 1000 | 1000 | subject matter described and claimed are considered to be within the scope of the invention as recited in the appended claims.

The construction and arrangement of the elements of the separation apparatus as shown in the embodiments is illustrative only. Although only a few embodiments of the present inventions have been described in detail in this disclosure, those of ordinary skill who review this disclosure will readily appreciate that many modifications are possible without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the embodiments without departing from the scope of the present invention as expressed in the appended claims.

What is claimed is:

1. A separation cartridge comprising:
a baffle including
a plurality of substantially S-shaped baffle members; and
a frame configured to hold the baffle members substantially parallel to each other; and
another separation medium positioned parallel to the baffle;
wherein the separation cartridge is configured to separate an oleo substance from an air stream in a kitchen hood system.

2. The separation cartridge of claim 1, wherein the another separation medium includes a bed of particles.

3. The separation cartridge of claim 1, wherein the plurality of baffle members form a plurality of channels, each channel having a single entry opening and a single exit opening.

4. The separation cartridge of claim 1, wherein the separation cartridge includes a mesh filter.

5. The separation cartridge of claim 1, wherein the plurality of baffle members have rounded edges.

6. A separation cartridge comprising:
a baffle including a plurality of substantially S-shaped baffle members positioned in a substantially parallel relationship to each other; and
another separation medium;
wherein the separation cartridge is configured to separate an oleo substance from an air stream in a kitchen hood system;
wherein the separation cartridge is configured so that the air stream passes through the baffle and the another separation medium in series.

7. The separation cartridge of claim 6, wherein the separation cartridge is configured to be mounted in a kitchen hood.

8. The separation cartridge of claim 6, wherein the plurality of baffle members have rounded edges.

9. The separation cartridge of claim 6, wherein the another separation medium includes a mesh filter.

10. The separation cartridge of claim 6, wherein the baffle and the another separation medium are positioned immediately adjacent to or in contact with each other.

11. A baffle for removing an oleo substance from an air stream in a kitchen hood system comprising:
a plurality of baffle members positioned substantially parallel to each other and extending between a first side of the baffle and a second side of the baffle, the plurality of baffle members defining a plurality of channels each comprising a single entry opening and a single exit opening, the plurality of baffle members having rounded edges;
wherein the minimum amount the oleo substance must be deflected to pass through each of the plurality of channels is at least approximately 180 degrees; and
wherein the baffle is configured to separate the oleo substance from the air stream in the kitchen hood system.

12. The baffle of claim 11, wherein the baffle members are substantially S-shaped.

13. The baffle of claim 11, wherein the minimum amount the substance must be deflected to pass through each of the plurality of channels is at least approximately 200 degrees.

14. A separation cartridge comprising the baffle recited in claim 11 and a bed of particles.

15. A separation cartridge comprising:
a baffle including a plurality of baffle members each of which has rounded edges; and
another separation medium;
wherein the separation cartridge is configured to separate an oleo substance from an air stream in a kitchen hood system.

16. The separation cartridge of claim 15, wherein the radius of the rounded edges is at least approximately 1.5 times the thickness of the baffle members.

17. The separation cartridge of claim 15, wherein the another separation medium includes a bed of particles.

18. The separation cartridge of claim 15, wherein the roundd edges are made by folding the baffle members over on themselves.

19. The separation cartridge of claim 15, wherein the baffle and the another separation medium are positioned immediately adjacent to or in contact with each other.

20. A baffle comprising a plurality of substantially S-shaped baffle members each of which has rounded edges, the baffle being configured to separate an oleo substance from an air stream in a kitchen hood system.

21. The baffle of claim 20, wherein the baffle is configured so that the minimum amount a substance must be deflected to pass through the baffle is at least approximately 180 degrees.

22. The baffle of claim 20, wherein the plurality of baffle members define a plurality of channels each of which has a single entry opening and a single exit opening.

23. A separation cartridge comprising the baffle recited in claim 20 and a bed of particles.

24. A separation cartridge comprising:
a baffle including a plurality of substantially S-shaped baffle members;
a mesh filter; and
a bed of particles;
wherein the separation cartridge is configured to separate an oleo substance from an air stream in a kitchen hood system.

25. The separation cartridge of claim 24, wherein the mesh filter is positioned between the baffle and the bed of particles.

26. A baffle comprising:
a plurality of baffle members defining a plurality of channels, each channel being configured to deflect an air stream in a kitchen hood system as the air stream passes through the channel;

a frame configured to hold the baffle members in a substantially parallel relationship to each other; and a plurality of particles positioned inside the channels.

27. The baffle of claim 26, wherein the particles include inorganic particles.

28. The baffle of claim 26, wherein the particles are porous.

29. A kitchen hood comprising:

a baffle including a plurality of baffle members each of which has rounded edges, the plurality of baffle members being substantially S-shaped; and a bed of particles;

wherein the baffle and the bed of particles are positioned in the kitchen hood.

30. The kitchen hood of claim 29, comprising a separation cartridge that includes the baffle and the bed of particles, the separation cartridge being mounted in the kitchen hood.

31. The kitchen hood of claim 29, comprising a mesh filter positioned in the kitchen hood.

32. A separation cartridge comprising:

a baffle including a plurality of baffle members each of which has rounded edges; and a bed of particles;

wherein the separation cartridge is configured to separate an oleo substance from an air stream in a kitchen hood system.

33. The separation cartridge of claim 32, wherein the plurality of baffle members are substantially S-shaped.

34. The separation cartridge of claim 32, comprising a mesh filter.

35. The separation cartridge of claim 32, wherein the minimum amount a substance must be deflected to pass through the baffle is at least approximately 180 degrees.

36. The separation cartridge of claim 32, wherein the baffle and the bed of particles are positioned immediately adjacent to or in contact with each other.

37. A separation cartridge comprising:

a baffle including a plurality of substantially S-shaped baffled members; and a bed of particles;

wherein the separation cartridge is configured to separate an oleo substance from an air stream in a kitchen hood system.

38. The separation cartridge of claim 37, comprising a mesh filter.

39. The separation cartridge of claim 37, wherein the baffle and the bed of particles are positioned immediately adjacent to or in contact with each other.

* * * * *